United States Patent
Vera-Castaneda

(10) Patent No.: US 11,185,812 B2
(45) Date of Patent: Nov. 30, 2021

(54) REGENERATIVE RECOVERY OF SULFUR DIOXIDE FROM EFFLUENT GASES

(71) Applicant: MECS, INC., Chesterfield, MO (US)

(72) Inventor: Ernesto Vera-Castaneda, Chesterfield, MO (US)

(73) Assignee: MECS, Inc., Chesterfield, MO (US)

(*) Notice: Subject to any disclaimer, the term of this patent is extended or adjusted under 35 U.S.C. 154(b) by 0 days.

(21) Appl. No.: 16/292,210

(22) Filed: Mar. 4, 2019

(65) Prior Publication Data

US 2019/0201837 A1    Jul. 4, 2019

Related U.S. Application Data

(62) Division of application No. 13/283,671, filed on Oct. 28, 2011, now Pat. No. 10,272,380.

(Continued)

(51) Int. Cl.
 *B01D 53/14* (2006.01)
 *B01D 53/50* (2006.01)
 (Continued)

(52) U.S. Cl.
 CPC ..... *B01D 53/1481* (2013.01); *B01D 53/1425* (2013.01); *B01D 53/507* (2013.01);
 (Continued)

(58) Field of Classification Search
 None
 See application file for complete search history.

(56) References Cited

U.S. PATENT DOCUMENTS 2,031,802 A    2/1936   Tyrer
2,729,543 A  * 1/1956   Keller ................. C01B 17/60
                                                    423/575

(Continued)

FOREIGN PATENT DOCUMENTS

CA    1106576 A    8/1981
CA    1210555 A    9/1986
(Continued)

OTHER PUBLICATIONS

European Search Report, Application No. 19156499.6, dated Jun. 24, 2019, 14 pages.

(Continued)

*Primary Examiner* — Sheng H Davis

(57) ABSTRACT

This invention relates to processes for selective removal of contaminants from effluent gases. A sulfur dioxide absorption/desorption process for selective removal and recovery of sulfur dioxide from effluent gases utilizes a buffered aqueous absorption solution comprising weak inorganic or organic acids or salts thereof, to selectively absorb sulfur dioxide from the effluent gas. Absorbed sulfur dioxide is subsequently stripped to regenerate the absorption solution and produce a sulfur dioxide-enriched gas. A process for simultaneous removal of sulfur dioxide and nitrogen oxides ($NO_x$) from effluent gases and recovery of sulfur dioxide utilizes a buffered aqueous absorption solution including a metal chelate to absorb sulfur dioxide and $NO_x$ from the gas and subsequently reducing absorbed $NO_x$ to form nitrogen. A process to control sulfate salt contaminant concentration in the absorption solution involves partial crystallization and removal of sulfate salt crystals.

13 Claims, 8 Drawing Sheets

Related U.S. Application Data

(60) Provisional application No. 61/408,420, filed on Oct. 29, 2010.

(51) Int. Cl.
*C01B 17/04* (2006.01)
*C01B 17/60* (2006.01)
*C01B 17/96* (2006.01)

(52) U.S. Cl.
CPC .......... *C01B 17/0408* (2013.01); *C01B 17/60* (2013.01); *C01B 17/96* (2013.01); *B01D 2257/80* (2013.01); *Y02A 50/20* (2018.01); *Y02P 20/10* (2015.11); *Y02P 20/129* (2015.11); *Y02P 20/50* (2015.11)

(56) References Cited

U.S. PATENT DOCUMENTS

| | | | |
|---|---|---|---|
| 3,653,812 A | 4/1972 | Schneider et al. | |
| 3,757,488 A | 9/1973 | Austin et al. | |
| 3,970,744 A * | 7/1976 | Riesenfeld | C01B 17/05 423/574.1 |
| 4,083,944 A | 4/1978 | Chalmers | |
| 4,133,650 A | 1/1979 | Germerdonk et al. | |
| 4,139,597 A | 2/1979 | Kohler et al. | |
| 4,140,751 A * | 2/1979 | Vasan | B01D 53/1481 423/242.3 |
| 4,181,506 A | 1/1980 | Bengtsson | |
| 4,222,991 A | 9/1980 | Hass | |
| 4,255,400 A * | 3/1981 | Hasebe | B01D 53/8609 423/235 |
| 4,310,691 A | 1/1982 | Bengtsson et al. | |
| 4,366,134 A | 12/1982 | Korosy et al. | |
| 4,432,962 A * | 2/1984 | Gowdy | C01B 17/05 423/224 |
| 4,444,571 A | 4/1984 | Matson | |
| 4,576,813 A | 3/1986 | McAlister et al. | |
| 4,670,242 A | 6/1987 | McAlister et al. | |
| 4,695,349 A * | 9/1987 | Becker | B01D 3/007 159/17.3 |
| 4,996,038 A | 2/1991 | McAlister et al. | |
| 5,068,419 A | 11/1991 | Kulprathipanja et al. | |
| 5,130,112 A | 7/1992 | McAlister et al. | |
| 5,292,407 A * | 3/1994 | Roy | B01D 53/1425 205/431 |
| 5,447,575 A | 9/1995 | Crump et al. | |
| 5,450,728 A | 9/1995 | Vora et al. | |
| 5,538,707 A | 7/1996 | McAlister | |
| 5,582,020 A | 12/1996 | Scaringe et al. | |
| 5,622,681 A * | 4/1997 | Grierson | B01D 53/1425 210/638 |
| 5,891,408 A | 4/1999 | Buisman et al. | |
| 6,096,239 A | 8/2000 | Fung et al. | |
| 6,960,332 B2 | 11/2005 | Erga | |
| 7,214,358 B2 * | 5/2007 | Ravary | B01D 53/1481 423/242.1 |
| 7,666,813 B2 | 2/2010 | Hoefer et al. | |
| 2003/0106852 A1 | 6/2003 | Erga | |
| 2004/0253159 A1 | 12/2004 | Hakka et al. | |
| 2005/0202967 A1 | 9/2005 | Hoefer et al. | |
| 2006/0021506 A1 | 2/2006 | Hakka et al. | |
| 2009/0205496 A1 | 8/2009 | Idem et al. | |
| 2010/0144908 A1 | 6/2010 | Campbell et al. | |
| 2010/0206202 A1 * | 8/2010 | Darde | B01D 53/04 110/204 |
| 2013/0008310 A1 | 1/2013 | Aroonwilas et al. | |

FOREIGN PATENT DOCUMENTS

| | | |
|---|---|---|
| CN | 1173830 | 2/1998 |
| CN | 101481095 A | 7/2009 |
| CN | 101869824 A | 10/2010 |
| CN | 102659568 B | 3/2015 |
| CN | 00525786 | 10/2018 |
| DE | 2623963 A1 | 12/1977 |
| EP | 1582250 | 10/2005 |
| IN | 301307 | 9/2018 |
| JP | 52014720 * | 2/1977 |
| JP | 53-106382 A | 9/1978 |
| WO | 8907973 | 9/1989 |
| WO | 96/24434 A1 | 8/1996 |

OTHER PUBLICATIONS

Extended European Search Report, Application No. 19156499.6, dated Nov. 19, 2019, 12 pages.
PCT International Search for Application No. PCT/US2011/058314; de Biasio, Arnaldo, Authorized Officer; ISA/EPO; dated Jan. 16, 2012.
Canada Search Report for Application No. 2816092; dated Aug. 6, 2018.
Canada Search Report for Application No. 2816092; dated Dec. 19, 2017.
Canada Search Report for Application No. 3054182; dated May 8, 2021.

* cited by examiner

REGENERATIVE RECOVERY OF SULFUR DIOXIDE FROM EFFLUENT GASES

CROSS-REFERENCE TO RELATED APPLICATION

This application is a division of application Ser. No. 13/283,671 filed on Oct. 28, 2011, now U.S. Pat. No. 10,272,380, which claims priority of U.S. Provisional Application No. 61/408,420 filed Oct. 29, 2010.

FIELD OF THE INVENTION

This invention relates to processes for the selective removal of contaminants from effluent gases. The present invention is particularly useful in producing a sulfur dioxide-enriched gas from effluent gases relatively weak in sulfur dioxide content.

BACKGROUND OF THE INVENTION

Gaseous effluents containing sulfur dioxide are produced by a variety of operations, including roasting or smelting of sulfidic metal ores and concentrates and the combustion of sulfur-containing carbon fuels (e.g., flue gases from coal-fired power plants). Carbon fuels play a significant role in the generation of electricity, providing energy for heating and fuels for transportation. Most carbon fuels contain sulfur that when burned turns into sulfur dioxide. The sulfur dioxide emitted contributes to a wide range of environmental and health problems. As the emerging economies expand, their demands for energy rapidly increase and as lower sulfur content carbon fuels are depleted, more and more oil and coal reserves having increasingly higher levels of sulfur will be utilized leading to increased sulfur dioxide emissions.

There are also increasing regulatory pressures to reduce sulfur dioxide emissions around the world. The most commonly used method to remove sulfur dioxide is through absorption or adsorption techniques. One common approach is to contact sulfur dioxide with an aqueous stream containing an inexpensive base. The sulfur dioxide dissolves in water forming sulfurous acid ($H_2SO_3$) that in turn reacts with the base to form a salt. Common bases are sodium hydroxide, sodium carbonate and lime (calcium hydroxide, $Ca(OH)_2$). The pH starts at about 9 and is lowered to about 6 after the reaction with sulfur dioxide. A one-stage wet scrubbing system usually removes over 95% of the sulfur dioxide. Wet scrubbers and similarly dry scrubbers require capital investment, variable costs due to lime consumption and solids disposal, and consume energy and utilities to operate such sulfur dioxide removal systems.

Instead of reacting with a base like lime, sulfur dioxide in effluent gases may be recovered to be sold as a product or used as part of a feed gas to a contact sulfuric acid plant and recovered as sulfuric acid and/or oleum to meet the growing global demand of the fertilizer industry or to produce refined sulfur dioxide. In addition to addressing the environmental and health problems associated with sulfur dioxide emissions, this approach recovers the sulfur values from coal and other sulfur-containing carbon fuels. However, these gas streams frequently have relatively low sulfur dioxide concentration and high concentration of water vapor. Where sulfur dioxide concentration in the gas fed to a sulfuric acid plant is less than about 4 to 5 percent by volume, problems may arise with respect to both water balance and energy balance in the acid plant. More particularly, the material balance of a conventional sulfuric acid plant requires that the $H_2O/SO_2$ molar ratio in the sulfur dioxide-containing gas stream fed to the plant be no higher than the $H_2O/SO_3$ molar ratio in the desired product acid. If the desired product acid concentration is 98.5 percent or above, this ratio cannot be more than about 1.08 in the sulfur dioxide-containing gas stream fed to the plant. As generated, effluent gases from metallurgical processes and flue gases from the combustion of sulfurous fuels often have a water vapor content well above the 1.08 ratio, which cannot be sufficiently reduced by cooling the gas without significant capital and energy expenditures. Moreover, if the sulfur dioxide gas strength of the effluent gas is below about 4 to 5 percent by volume, it may not be sufficient for autothermal operation of the catalytic converter. That is, the heat of conversion of sulfur dioxide to sulfur trioxide may not be great enough to heat the incoming gases to catalyst operating temperature and, as a consequence, heat from some external source must be supplied. This in turn also increases both operating costs and capital requirements for the sulfuric acid facility.

Sulfur dioxide strength of gaseous effluents may be enhanced by selectively absorbing the sulfur dioxide in a suitable solvent and subsequently stripping the absorbed sulfur dioxide to produce regenerated solvent and a gas enriched in sulfur dioxide content. A variety of aqueous solutions and organic solvents and solutions have been used in sulfur dioxide absorption/desorption processes. For example, aqueous solutions of alkali metals (e.g., sodium sulfite/bisulfite solution), amines (e.g., alkanolamines, tetrahydroxyethylalkylenediamines, etc.), amine salts and salts of various organic acids have been used as regenerable sulfur dioxide absorbents.

Buffer solutions are also effective in absorbing sulfur dioxide. Fung et al. (2000) provides data on the solubility of sulfur dioxide for a 1 molar solution of phosphoric acid and sodium carbonate in a ratio of about 1.57 $Na/PO_4$ as a function of temperature. Data are for the virgin mixture and the mixture where 1,000 ppm of adipic acid is added to enhance sulfur dioxide solubility. Fung et al. also indicate that when taken to a boiling temperature, 95% and 65% of the sulfur dioxide is removed, respectively, for the virgin mixture and mixture containing adipic acid. Calculations on the pH of the solution show that the pH changes from 6 to about 3 once sulfur dioxide is absorbed. As with organic solvents there is a slight reaction of sulfur dioxide with oxygen forming sulfur trioxide. Although this reaction is very limited and when $Na_2CO_3$ is used it is further inhibited by its reaction with the free radicals formed during oxidation, the sulfur trioxide that is formed leads to the formation of sodium sulfate, which if the sodium sulfate is removed by crystallization, it is removed as sodium sulfate decahydrate ($Na_2SO_4.10H_2O$), also known as Glauber's salt. This salt can be removed by taking a slipstream and cooling it to force the precipitation of the Glauber's salt that is easily crystallized and removed by a screen, filtration, centrifugation or other solid/liquid separation technique.

U.S. Pat. No. 4,133,650 (Gamerdonk et al.) discloses a regenerative process for recovering sulfur dioxide from exhaust gases using a regenerable, aqueous dicarboxylic acid (e.g., phthalic acid, maleic acid, malonic acid and glutaric acid and mixtures thereof) scrubbing solution buffered to a pH of from about 2.8 to 9. The recovered sulfur dioxide can be used in the production of sulfuric acid.

Similarly, U.S. Pat. No. 2,031,802 (Tyrer) suggests using salts of substantially non-volatile acids having a disassociation constant between $1\times10^{-2}$ and $1\times10^{-5}$ measured at a dilution of 40 liters per gram molecule and a temperature of 25° C. (e.g., lactic acid, glycolic acid, citric acid and ortho-phosphoric acid) in a regenerative process for the recovery of sulfur dioxide from effluent gases.

U.S. Pat. No. 4,366,134 (Korosy) discloses a regenerative flue gas desulfurization process that utilizes an aqueous solution of potassium citrate buffered to a pH of from about 3 to about 9.

Organic solvents used in sulfur dioxide absorption/desorption processes include dimethyl aniline, tetraethylene glycol dimethyl ether and dibutyl butyl phosphonate. Like most solvents, the capacity of organic solvents is enhanced by higher pressures and lower temperatures. The sulfur dioxide gas is then recovered by lowering the pressure and/or increasing the temperature. These organic solvents require the use of metallic construction and often require solvent regeneration due to the formation of sulfuric acid and in some cases due to the reaction of the solvent with sulfur trioxide formed by side reaction of sulfur dioxide with oxygen during the absorption/desorption process. Organic solvents are usually more expensive than the aqueous absorption solutions.

The significantly large flue gas flow rates emitted from a coal-fired power generation plant, lead to very large equipment size to recover the sulfur dioxide. Organic solvents that require metallic construction generally do not compete well economically with the wet scrubbers that commonly use fiber reinforced plastic (FRP) construction, coated vessels or low cost alloys.

Conventional organic solvents are also hampered by one or more shortcomings with regard to the characteristics desirable in an absorbent used in a sulfur dioxide absorption/desorption cycle. Many of these solvents have relatively low sulfur dioxide absorption capacity, especially at the sulfur dioxide partial pressures typically encountered in weak sulfur dioxide-containing effluents (e.g., from about 0.1 to about 5 kPa). These solvents often absorb substantial quantities of water vapor from the sulfur dioxide-containing effluent resulting in a significant reduction in the sulfur dioxide absorption capacity of the solvent. As a result, the molar flow rates of these solvents needed to satisfy the desired sulfur dioxide absorption efficiency is increased. Furthermore, the absorption of large quantities of water vapor in the solvent may lead to excessive corrosion of process equipment used in the sulfur dioxide absorption/desorption process. Moreover, some of these solvents are susceptible to excessive degradation, such as hydrolysis, or other side reactions or decomposition when the solvent is exposed to high temperatures in acidic environments and/or suffer from high volatility, leading to large solvent losses.

Thus, a need has remained for processes and sulfur dioxide absorption solvents and/or solutions effective for selective and energy efficient removal and recovery of sulfur dioxide from effluent gases.

SUMMARY OF THE INVENTION

In accordance with the present invention, an improved process for the selective removal of contaminants from effluent gases has been devised. In some embodiments of the present invention sulfur dioxide is selectively removed and recovered from effluent gases in a sulfur dioxide absorption/desorption process that utilizes a buffered aqueous absorption solution comprising certain weak inorganic or organic acids or salts thereof, preferably certain polyprotic carboxylic acids or salts thereof, to selectively absorb sulfur dioxide from the effluent gas. The present invention also provides improved energy efficiency in the regeneration of the absorption solution by utilizing an integrated sulfur dioxide stripper and heat pump system or vapor compression technique. Certain embodiments of the present invention relate to a process for simultaneous removal of sulfur dioxide and nitrogen oxides ($NO_x$) from effluent gases and recovery of sulfur dioxide. Still further, the present invention provides a process to control sulfate salt contaminant concentration in the absorption solution by partial crystallization and removal of the sulfate salt crystals.

Briefly, therefore, the present invention is directed to a process for selectively removing and recovering sulfur dioxide from a sulfur dioxide-containing effluent gas. The process comprises contacting a sulfur dioxide-containing effluent gas with a buffered aqueous absorption solution comprising sodium malate or metal salts of certain other weak polyprotic carboxylic acids in a sulfur dioxide absorber, thereby absorbing sulfur dioxide from the effluent gas into the absorption solution and producing an exhaust gas from which sulfur dioxide has been removed and a sulfur dioxide-enriched absorption solution. The sulfur dioxide-enriched absorption solution is subsequently heated to desorb sulfur dioxide in a sulfur dioxide stripper and thereby produce a regenerated sulfur dioxide absorption solution and a sulfur dioxide-enriched stripper gas. The regenerated sulfur dioxide absorption solution is reintroduced to the sulfur dioxide absorber.

The present invention is further directed to a process for selectively removing and recovering sulfur dioxide from a sulfur dioxide-containing effluent gas wherein the effluent gas and oxygen are contacted with a buffered aqueous absorption solution in a sulfur dioxide absorber to produce an exhaust gas from which sulfur dioxide has been removed and a sulfur dioxide-enriched absorption solution. The buffered aqueous absorption solution comprises a salt of a polyprotic carboxylic acid and an oxidation inhibitor selected from the group consisting of ascorbic acid, ethylenediaminetetraacetic acid, p-phenylenediamine, hydroquinone and mixtures thereof. The sulfur dioxide-enriched absorption solution is subsequently heated to desorb sulfur dioxide in a sulfur dioxide stripper and thereby produce a regenerated sulfur dioxide absorption solution and a sulfur dioxide-enriched stripper gas. The regenerated sulfur dioxide absorption solution is reintroduced to the sulfur dioxide absorber.

The present invention is also directed to a process for recovering sulfur dioxide from an aqueous sulfur dioxide-enriched absorption solution comprising a salt of a polyprotic carboxylic acid and used in the regenerative recovery of sulfur dioxide from an effluent gas. The process comprises heating the sulfur dioxide-enriched absorption solution to desorb sulfur dioxide in a sulfur dioxide stripper and thereby produce a regenerated sulfur dioxide absorption solution and a sulfur dioxide-enriched stripper gas comprising water vapor. The sulfur dioxide-enriched stripper gas is cooled in a high temperature overhead condenser of the sulfur dioxide stripper to condense water vapor and produce a high temperature overhead condenser gas effluent comprising sulfur dioxide and water vapor and an aqueous condensate comprising sulfur dioxide. The regenerated sulfur dioxide absorption solution is heated in a reboiler of the sulfur dioxide stripper, wherein the high temperature overhead condenser comprises a heat pump system evaporator in which a refrigerant is evaporated upon heat transfer from the sulfur dioxide-enriched stripper gas and the reboiler of the sulfur dioxide stripper comprises a heat pump system condenser in which the refrigerant is condensed upon heat transfer to the regenerated sulfur dioxide absorption solution. Preferably, the regenerated sulfur dioxide absorption solution is heated to a temperature not greater than about 20° C. in excess of the temperature of the aqueous condensate. The aqueous condensate from the high temperature overhead condenser is heated to desorb sulfur dioxide in a condensate stripper and produce a condensate stripper gas comprising water vapor and sulfur dioxide desorbed from the aqueous condensate. The condensate stripper gas and high temperature overhead condenser gas effluent are cooled in a low temperature condenser to condense water vapor and produce a recovered sulfur dioxide stream comprising sulfur dioxide obtained in both the aqueous condensate and in the high temperature overhead condenser gas effluent and a stripped condensate effluent depleted in sulfur dioxide.

In an alternative embodiment of the present invention, the process for recovering sulfur dioxide from an aqueous sulfur dioxide-enriched absorption solution comprises heating the sulfur dioxide-enriched absorption solution to desorb sulfur dioxide in a sulfur dioxide stripper and thereby produce a regenerated sulfur dioxide absorption solution and a sulfur dioxide-enriched stripper gas comprising water vapor. The pressure of the sulfur dioxide-enriched stripper gas is increased and the pressurized sulfur dioxide-enriched stripper gas is cooled by transfer of heat to the regenerated sulfur dioxide absorption solution in a reboiler of the sulfur dioxide stripper to condense water vapor and produce a reboiler gas effluent comprising sulfur dioxide and water vapor and an aqueous condensate comprising sulfur dioxide. The aqueous condensate from the reboiler is heated to desorb sulfur dioxide in a condensate stripper and produce a condensate stripper gas comprising water vapor and sulfur dioxide desorbed from the aqueous condensate. The condensate stripper gas and reboiler gas effluent are cooled in a low temperature condenser to condense water vapor and produce a recovered sulfur dioxide stream comprising sulfur dioxide obtained in the aqueous condensate and in the reboiler gas effluent and a stripped condensate effluent depleted in sulfur dioxide.

The present invention is also directed to a process for simultaneous removal of sulfur dioxide and $NO_x$ from a sulfur dioxide-containing effluent gas, which comprises $NO_x$, and recovering sulfur dioxide. The process comprises contacting the effluent gas with a buffered aqueous absorption solution comprising a salt of a polyprotic carboxylic acid, ascorbic acid and a metal chelate (metal complex) comprising a chelating agent and a metal cation in an absorber, thereby absorbing sulfur dioxide and $NO_x$ from the effluent gas into the absorption solution and producing an exhaust gas from which sulfur dioxide and $NO_x$ has been removed and an absorption solution enriched in sulfur dioxide and $NO_x$ and comprising bisulfite anion. The $NO_x$ absorbed in the absorption solution is then reduced to form nitrogen and bisulfate anion and the absorption solution is heated to desorb sulfur dioxide in a sulfur dioxide stripper and thereby produce a regenerated absorption solution and a stripper gas comprising sulfur dioxide and nitrogen. The regenerated sulfur dioxide absorption solution is reintroduced to the sulfur dioxide absorber.

In yet another embodiment, the present invention is directed to a process for treating a regenerated sulfur dioxide absorption solution used in the regenerative recovery of sulfur dioxide from a sulfur-dioxide containing effluent gas wherein the regenerated absorption solution comprises a salt of a polyprotic carboxylic acid and sulfate salt and controlling the sulfate salt concentration at an acceptable level. The process comprises treating a slip stream of the regenerated absorption solution. More particularly the process comprises providing a slip stream wherein the slip stream is a portion of the regenerated sulfur dioxide absorption solution, evaporating water from the slip stream at a temperature of at least about 40° C. to produce a concentrated aqueous absorption solution supersaturated in the sulfate salt. Sulfate salt crystals are thereafter precipitated from the concentrated aqueous absorption solution to form a crystallization slurry comprising precipitated sulfate salt crystals and a mother liquor. The sulfate salt crystals are then separated from the mother liquor to form a treated aqueous absorption solution comprising the polyprotic carboxylic acid salt.

Other objects and features will be in part apparent and in part pointed out hereinafter.

BRIEF DESCRIPTION OF THE DRAWINGS

Corresponding reference characters indicate corresponding components throughout the drawings.

DESCRIPTION OF THE PREFERRED EMBODIMENTS

Figure 1:
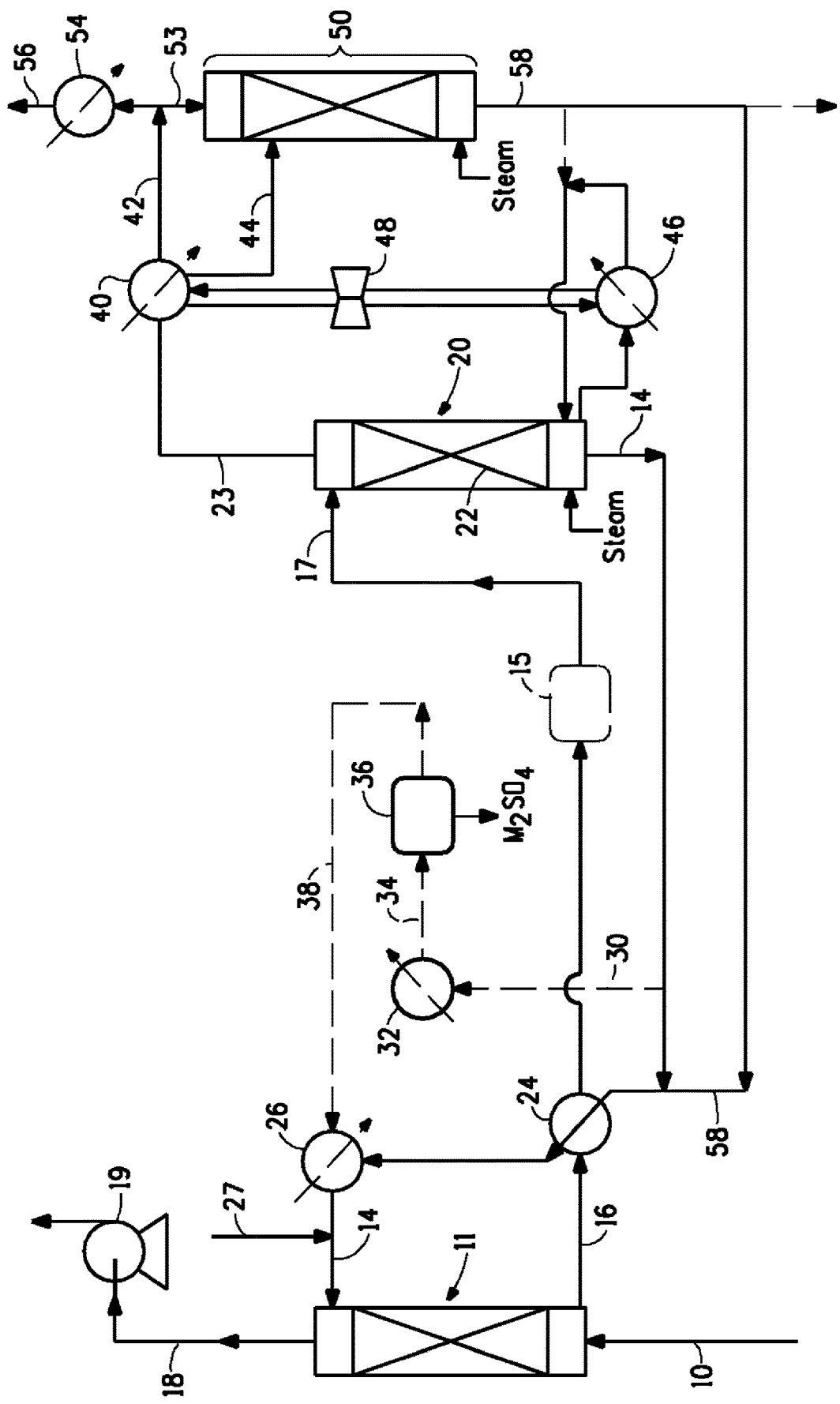
FIG. 1 is a schematic flow sheet illustrating one embodiment of the process of the present invention for selectively removing and recovering sulfur dioxide from a sulfur dioxide-containing effluent gas and including an integrated sulfur dioxide stripper and heat pump system.

Improved sulfur dioxide absorption/desorption processes for the recovery of sulfur dioxide from effluent gases have been devised. The use of regenerative absorption/desorption of sulfur dioxide permits the selective removal and recovery of sulfur dioxide that otherwise may be emitted to the atmosphere. The recovered sulfur dioxide may be sold as a product or used as part of the feed gas to a contact sulfuric acid plant for the production of sulfuric acid and/or oleum or a Claus plant for the preparation of elemental sulfur. The present invention also provides processes with reduced energy requirements for regeneration of a sulfur dioxide absorption solution and effective control of sulfate levels in the absorption solution.

In accordance with a preferred embodiment, the absorption solution used in the present invention comprises a buffered aqueous solution of a salt of a relatively weak polyprotic carboxylic acid, wherein a polyprotic carboxylic acid is a carboxylic acid having two or more protons that can be removed upon reaction with a base. Since water is typically present in the sulfur dioxide-containing effluent gas to be treated, such as a flue gas, the absorption solution preferably lowers the water vapor pressure thereby decreasing the energy required to desorb the sulfur dioxide, reducing the possibility of forming salt precipitates, and generating a sulfur dioxide-enriched gas of higher concentration. The acid salt should have a strong affinity for sulfur dioxide, as an acid salt absorbent for sulfur dioxide, to effectively remove the sulfur dioxide from the sulfur dioxide-containing effluent gas even at concentrations of a few ppm in an absorber with one or more theoretical equilibrium stages.

Once absorbed, the sulfur dioxide reacts with the acid salt in the absorption solution to form a complex. The absorbed sulfur dioxide may form bisulfite ($HSO_3^-$) and sulfite ($SO_3^{2-}$) ions in solution. Accordingly, the solubility of the complex formed with sulfur dioxide (the corresponding bisulfite and sulfite) is preferably highly dependent on temperature such that relatively mild heating and/or reduced pressure can be utilized to release sulfur dioxide and regenerate the absorption solution for further absorption of sulfur dioxide. The preferred absorption solution used in the practice of the present invention takes advantage of the acidity of sulfur dioxide to selectively absorb the sulfur dioxide into the absorption solution in the presence of the other components of the effluent gas even at very low concentrations (20 ppm or lower) and then easily release it when applying mild heating and/or reduced pressure to the absorption solution enriched in sulfur dioxide.

The pKa values of the polyprotic carboxylic acids used in the absorption solutions is a key criterion for selection of an effective sulfur dioxide absorption solution. As the pKa value increases, the sulfur dioxide absorption capacity also increases, lowering the amount of absorption solution required and in turn reducing the size of the absorber. However, higher pKa values may make it more difficult to release the sulfur dioxide and regenerate the sulfur dioxide absorption solution with mild heating and/or reduced pressure. Conversely, sulfur dioxide absorption capacity tends to decrease with the pKa value, but may facilitate release of the absorbed sulfur dioxide during heat regeneration. Consequently, in view of these considerations, the polyprotic carboxylic acid utilized in the sulfur dioxide absorption solution generally exhibits one or more pKa values that provide acceptable sulfur dioxide absorption capacity while minimizing energy requirements for sulfur dioxide desorption with mild heating. More particularly, the pKa value(s) is preferably from about 3 to about 10 at 25° C., preferably from about 4 to about 7 at 25° C. Preferably, the absorption solution comprises the salt of a polyprotic carboxylic acid having two or more carboxylic acid groups. Since polyprotic carboxylic acids are able to undergo a plurality of dissociations each having a pKa value, at least one of the pKa values is from about 3 to about 10 at 25° C., preferably from about 4 to about 7 at 25° C. Preferred polycarboxylic acids salts have other polar groups. Having polar groups in the acid salt contributes to improving water solubility and lowering the water vapor pressure. The lower water vapor pressure in turn leads to a sulfur dioxide-enriched gas containing a higher concentration of sulfur dioxide.

Examples of preferred polyprotic carboxylic acids for use in the absorption solution include malic acid, citric acid, phthalic acid, teraphthalic acid, succinic acid, glutaric acid, tartaric acid, nitrilotriacetic acid and ethylenediaminetetraacetic acid (EDTA). Examples of other suitable, but less preferred carboxylic acids include nicotinic acid (niacin) and levulinic acid. The sulfur dioxide absorption solution may comprise mixture of acid salt absorbents.

Table 1 lists the pKa of several carboxylic acids and their salts suitable for use in the practice of the present invention.

TABLE 1

| pKas for the Acids and Salts | | | | | |
|---|---|---|---|---|---|
| Component | Formula | Temperature | pKa$_1$ | pKa$_2$ | pKa$_3$ |
| Levulinic Acid | 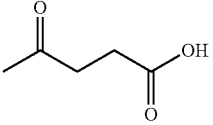 | 25° C. | 4.59 | | |
| Nicotinic acid | 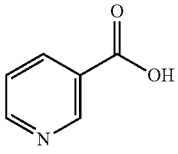 | | 4.75 | | |
| Succinic Acid | 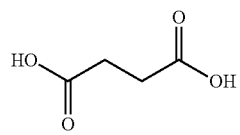 | 25° C. | 4.16 | 5.61 | |
| L-Glutaric Acid | 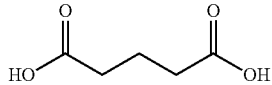 | 25° C. | 4.31 | 5.41 | |

TABLE 1-continued pKas for the Acids and Salts

| Component | Formula | Temperature | pKa$_1$ | pKa$_2$ | pKa$_3$ |
|---|---|---|---|---|---|
| Citric Acid | 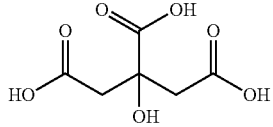 | 20° C. | 3.14 | 4.77 | 6.39 |
| Terephthalic Acid | 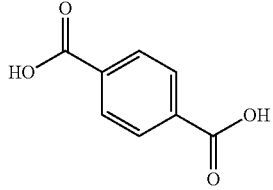 [SMILES: O=C(O)c1ccc(C(=O)O)cc1] | 25° C./16° C. | 3.51 | 4.82 | |
| o-Phthalic Acid | 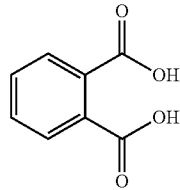 [SMILES: O=C(O)c1ccccc1C(=O)O] | 25° C. | 2.89 | 5.51 | |
| Malic Acid | 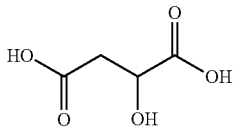 | 25° C. | 3.4 | 5.11 | |

As described in greater detail below, salts are formed in the buffered aqueous absorption solution by the reaction of a metal base (e.g., sodium hydroxide, potassium hydroxide, sodium carbonate, etc.) introduced into the absorption solution in quantities sufficient to neutralize at least some of the acid groups. Accordingly, depending on the absorbent acid and base employed, the salts present in the absorption solution include sodium or potassium malate, citrate (e.g., hydrogen citrate, dihydrogen citrate), phthalate, teraphthalate, succinate, glutarate, tartrate, nitrilotriacetate, ethylenediamine tetraacetate, nicotinate, levulinate, etc. In accordance with a particularly preferred embodiment, the buffered aqueous absorption solution comprises sodium malate as the sulfur dioxide acid salt absorbent. Salts, such as sodium malate, suppress bisulfite oxidation and sulfate formation in the absorption solution.

In order to maintain acceptable sulfur dioxide absorption capacity and minimize energy requirements for regeneration of the buffered aqueous absorption solution, neutralization of the acid in the absorption solution after contact with the sulfur dioxide-containing effluent gas is preferably controlled in a manner such that the acid is neutralized to within about 20%, more preferably to within about 10%, of the equivalence point of the acid group having a pKa value of from about 3 to about 10 at 25° C., preferably from about 4 to about 7 at 25° C. That is, the quantity of base added to the absorption solution on a molar basis will be within 20% of the equivalence point, more preferably within 10% of the equivalence point, wherein the equivalence point is the number of moles needed to stoichiometrically react with the acid group(s) having a pKa value within the desired range. Thus, at the equivalence point, the quantity of base added to the absorption solution, on a molar basis, is 100% of the stoichiometric amount to react with the acid group(s) having a pKa within the desired range, i.e., complete neutralization.

In accordance with an especially preferred embodiment, the acid groups having a pKa value of from about 3 to about 10 at 25° C., preferably from about 4 to about 7 at 25° C., are substantially completely neutralized. In the case of an absorption solution comprising a polyprotic carboxylic acid having two or more carboxylic acid groups capable of dissociation it may be advantageous to neutralize the more acidic acid groups to form a weaker acid of the original acid having a more desirable pKa within the preferred range. For example, malic acid with a first pKa of about 3.4 and a second pKa of about 5.11 at 25° C., may be neutralized with a base such that the more acidic acid carboxylic group is completely neutralized and the second, less acidic carboxylic group is neutralized within about 20%, more preferably to within about 10%, of the equivalence point of the acid dissociation having a pKa value of 5.11 at 25° C.

FIG. 1 is a schematic flow sheet illustrating one embodiment of the process of the present invention for selectively removing and recovering sulfur dioxide from a sulfur dioxide-containing effluent gas.

The sulfur dioxide-containing effluent gas may be derived from a variety of sources including: flue gas generated in the combustion of sulfurous carbon fuels (e.g., effluent from coal-fired power generation plants); gaseous effluents from metal roasting operations; incinerator tails gas of a Claus plant; exhaust gas from a sulfur trioxide absorber of a contact sulfuric acid plant; and other systems where dilute streams of sulfur dioxide may be emitted to the atmosphere or where the sulfur dioxide is to be removed prior to further treatment or use. As noted previously, in some embodiments, the present invention is used for the recovery of sulfur dioxide from effluents relatively weak in sulfur dioxide content. Thus, in accordance with one embodiment of the present invention, the effluent gas contains from about 0.01 to about 5 volume percent sulfur dioxide. However, it should be understood that the present invention can be employed to reduce the sulfur dioxide gas strength of effluent gases where the sulfur dioxide concentration could be substantially higher than 5% by volume. In addition to sulfur dioxide, the effluent gas typically contains carbon dioxide, nitrogen oxides ($NO_x$), oxygen, nitrogen and other inert components and water vapor. In most cases, the effluent gas comprises water vapor. However, it should be understood that in the practice of the present invention, the effluent gas may alternatively be substantially anhydrous, for example, when the effluent gas is the effluent from the sulfur trioxide absorber of a contact sulfuric acid plant.

Typically, the effluent gas is at an elevated temperature and may contain entrained particulate impurities. In such instances, the effluent gas may be conditioned prior to being introduced into the sulfur dioxide absorber by cleaning the gas to remove particulates and cooling the gas to maintain the desired temperature in the absorber. Depending upon the temperature and composition of the sulfur dioxide-containing effluent gas, the effluent gas may be suitably conditioned by a variety of conventional practices well-known to those skilled in the art. For example, the effluent gas may first be passed through a waste heat boiler where the gas is cooled by generation of high pressure steam before being passed sequentially through a humidifying tower and one or more indirect heat exchangers, where the gas is further cooled (e.g., with cooling tower water) and an electrostatic precipitator where remaining particulates are removed from the cooled gas. Alternatively, the effluent gas may be conditioned by passing the gas through one or more reverse jet scrubbers of the type sold by MECS, Inc., Saint Louis, Mo. 63178-4547 under the trademark DYNAWAVE.

A waste heat boiler may be used to partially cool the effluent gas, such as a flue gas or a tail gas, from a typical temperature of around 140° C. to a temperature close to the boiling point of the aqueous absorption solution (e.g., about 100° C.) and to provide heat for desorption of sulfur dioxide. In another embodiment, a heat pump may be used to extract heat from the effluent gas and use the extracted heat in the regeneration of the solvent. Furthermore, a pre-scrubber may be used for several purposes including: to lower the temperature of the sulfur dioxide-containing effluent gas; to saturate the effluent gas with water (minimizing changes of concentration in the absorbent solution); and to remove particulates and other components (e.g., mercury, chlorides, fluorides, etc.) present in the sulfur dioxide-containing effluent gas. After conditioning, the effluent gas is typically saturated with water vapor at a temperature from about 10° C. to about 50° C.

As shown in FIG. 1, a sulfur-dioxide containing effluent gas 10 is introduced into a sulfur dioxide absorber 11 having one or more theoretical stages where it is contacted with a buffered aqueous absorption solution comprising a salt of a polyprotic carboxylic acid as described above to absorb the sulfur dioxide. Sulfur dioxide absorber 11 as shown is a vertical tower containing means for promoting mass transfer between the gas and liquid phases which may comprise a bed of random packings (not shown) such as saddles or rings, structured packing, or other contacting device. Absorber 11 may also be referred to herein as absorber tower 11. Preferably, in order to maximize transfer of sulfur dioxide, effluent gas 10 is contacted counter currently with the aqueous absorption solution. As shown in FIG. 1, effluent gas 10 is introduced through an inlet near the bottom of absorber tower 11 and regenerated aqueous absorption solution 14 returned from the sulfur dioxide stripper 20 (defined later herein) is introduced through a liquid inlet near the top of absorber tower 11 and distributed over packing (not shown). Sulfur dioxide-enriched solution 16 is withdrawn from a liquid outlet near the bottom of absorber tower 11 and an exhaust gas stream 18 substantially free of sulfur dioxide is removed from an outlet near the top of absorber tower 11. Although a conventional, randomly packed tower may be employed as absorber 11, those skilled in the art will appreciate that other configurations may be suitably employed. For example, absorber tower 11 may contain structured packing or comprise a tray tower, in either of which the process streams preferably flow counter currently.

The number of equivalent moles of acid salt absorbent present in the buffered aqueous absorption solution generally should be higher than the number of moles of sulfur dioxide to be recovered from effluent gas 10 to compensate for several factors such as: the amount of sulfur dioxide remaining in regenerated aqueous absorption solution 14 after regeneration of the absorption solution; the concentration of sulfur dioxide in the sulfur dioxide-enriched stripper gas; the possible presence of slightly acidic components such as carbon dioxide; but mainly to compensate for desirably relatively weak absorption of the polyprotic carboxylic acid/salt absorption system (preferred to facilitate the desorption of sulfur dioxide via a mild temperature increase and/or reduction of pressure). Accordingly, the concentration of the polyprotic carboxylic acid/salt in the aqueous absorption solution necessary to attain the desired removal efficiency will vary with the acid employed, the concentration of sulfur dioxide in the gas to be treated as well as the mass transfer characteristics of the absorber and can be readily determined by one skilled in the art. Typically, the molar ratio of sulfur dioxide absorbed per equivalent mole of polyprotic carboxylic acid salt in the absorption solution will range from about 0.1 to about 1. In the case of an absorption solution comprising the sodium salt of malic acid to treat a gas comprising about 2600 ppmv (parts per million by volume) sulfur dioxide, the concentration of malate in the absorption solution can suitably range from about 1 mole % to about 7 mole %.

Returning to FIG. 1, the mass flow rate ratio (L/G) of regenerated absorption solution stream 14 and effluent gas 10 necessary to achieve substantial transfer of sulfur dioxide from the effluent gas to the absorption solution in absorber 11 may be determined by conventional design practice. Preferably, the sulfur dioxide absorber is designed and operated such that the sulfur dioxide content of exhaust gas stream 18 exiting absorber 11 is less than about 500 ppmv, more preferably less than about 200 ppmv (e.g., as low as 10-20 ppmv). This trace amount of sulfur dioxide along with carbon dioxide, oxygen, nitrogen and other inert materials contained in effluent gas 10 are eliminated as part of exhaust gas stream 18 vented from the top of absorber 11. Exhaust gas stream 18 is in substantial equilibrium with absorption solution and, depending on the water vapor content of effluent gas 10 and absorber 11 conditions, there may be a net gain or loss of water in absorber 11. If necessary, blower 19 is used to drive the gases to the stack. In order to achieve satisfactory emission standards, exhaust gas stream 18 may be passed through a mist eliminator or similar device (not illustrated) for recovery of entrained liquid before being discharged through a stack. In addition or alternatively, in some cases exhaust gas stream 18 may be heated by indirect heat exchange with the incoming flow of process feed gas 10 or using other heating media so that any plume will not have the tendency to descend after being emitted through the stack.

Make-up source of metal base 27 such as sodium hydroxide, potassium hydroxide, sodium carbonate, etc., is combined with the regenerated aqueous absorption solution stream 14 introduced near the top of absorber tower 11. Metal base 27 reacts with the polyprotic carboxylic acid to form the metal salt absorbent. In accordance with the disclosure above, sufficient metal base 27 is introduced to neutralize at least some of the acid groups such that the acid is neutralized to within about 20%, more preferably to within about 10%, of the equivalence point of the acid dissociation having a pKa value of from about 3 to about 10 at 25° C., preferably from about 4 to about 7 at 25° C. One skilled in the art can use known pH control techniques and instrumentation to add base to the absorption solution contacted with the sulfur dioxide-containing gas in the absorber to maintain the desired degree of neutralization with respect to the equivalence point of the pKa value. Furthermore, sufficient base should be added to control the metal ion concentration. For example, as described below, some of the metal ion will be lost with the sulfate salt removed in a crystallizer operation. Two moles of the base (e.g., sodium hydroxide), are added per mole of sodium sulfate removed. The metal ion concentration can be suitably monitored and controlled by taking samples and running metal analysis in the plant laboratory.

The sulfur dioxide-enriched absorption solution 16 exiting absorber 11 passes through heat interchanger 24 where it is heated to an intermediate temperature. Additional heating may be provided via a waste heat boiler, a reboiler, or any other external heat source such as live steam (not shown). Now preheated enriched solution 17 is introduced into sulfur dioxide stripper 20 wherein bisulfite reverts to sulfur dioxide and is desorbed from the solution. Stripper 20 as shown is a vertical tower containing means for promoting mass transfer between the gas and liquid phases. Like absorber 11, stripper 20 is shown in FIG. 1 as configured in the form of a vertical tower, which contains means for promoting mass transfer between the gas and liquid phases which may comprise a bed of random packings (not shown) such as saddles or rings, structured packing, trays or any other gas-liquid contacting device. Stripper 20 may also be referred to herein as stripper tower 20. The lower (stripping) section of stripper tower 20 may be fed with steam and used to remove the sulfur dioxide from the absorption solution and the top of stripper tower 20 (refining section) is used to reduce the amount of water in the sulfur dioxide. In accordance with one embodiment, sulfur dioxide-enriched solution 16 is heated by transferring heat from effluent gas 10 and/or regenerated absorption solution 14 without the addition of extraneous heat. In such an embodiment, the temperature of effluent gas 10 is preferably not reduced to below about 50° C. and the difference in temperature between preheated enriched solution 17 introduced to stripper 20 and regenerated absorption solution 14 is less than about 40° C. Sulfur dioxide-enriched stripper gas 23 is produced in the overhead of stripper 20 and regenerated absorption solution 14 is withdrawn from the bottom of stripper tower 20 and sent back to absorber 11 completing the cycle. Although a conventional packed tower may be employed, those skilled in the art will appreciate that stripper 20, like absorber 11, may have other suitable configurations, including a tower containing structured packing, trays or other contacting devices.

The average temperature of the sulfur dioxide absorption solution in absorber 11 will generally be maintained in the range of from about 10° C. to about 70° C. In accordance with the present invention, the average temperature of the sulfur dioxide absorption solution in absorber 11 is preferably maintained from about 20° C. to about 60° C. Although in general the absorption of sulfur dioxide is enhanced at lower solution temperatures, the absorption solution needs to be heated from the absorption temperature to a temperature sufficiently high and/or under reduced pressure to release the sulfur dioxide and providing this sensible heat leads to higher energy demands. During regeneration, it is also desirable to reduce the amount of water vaporized to lower the energy consumed and avoid low water concentrations in the liquid that may cause the precipitation of the weak polycarboxylic acid or salts. The overall efficiency of the sulfur dioxide absorption/desorption process is improved when the absorption dependence is more strongly dependent on temperature and within a narrower range of temperatures between absorption and desorption stages of the cycle.

The average temperature of the sulfur dioxide absorption solution in stripper 20 will generally be maintained in the range of from about of 60° C. up to the boiling point of this solution at stripper 20 operating pressure.

The absorption and desorption of sulfur dioxide may be enhanced by increasing or decreasing the operating pressures of absorber 11 and stripper 20, respectively. Suitable operating pressures in absorber 11 are from about 70 to about 200 kPa absolute. Pressure increases the amount of sulfur dioxide which the absorption solution can absorb, but the absorption can be carried out at relatively low pressure thereby reducing equipment costs. Similarly, suitable operating pressures in stripper 20 are from about 40 to about 200 kPa absolute, but higher or lower operating pressures may be employed.

Temperature control within absorber 11 and stripper 20 may be achieved by controlling the temperature of various process streams fed to these operations. Preferably, the temperature in stripper 20 is maintained within the desired range by controlling the temperature of preheated enriched solution 17. Again referring to FIG. 1, sulfur dioxide-enriched solution 16 exiting absorber 11 at a temperature of from about 10° C. to about 70° C., more preferably from about 20° C. to about 60° C. is passed through heat interchanger 24 where it is preheated to an intermediate temperature by indirect transfer of heat from regenerated absorption solution 14 being recycled from stripper 20 to absorber 11. If further heating is required in order to achieve the desired temperature in stripper 20, preheated enriched solution 17 may be passed through a solvent heater (not shown), and further heated by indirect heat exchange with steam. Steam may also be introduced near the bottom of stripper 20. Regenerated absorption solution 14 exiting the bottom of stripper 20 at a temperature from about 60° C. to about 140° C. is cooled in interchanger 24 by transfer of heat to the sulfur dioxide-enriched solution 16 exiting absorber 11. Similarly, if further cooling is required in order to maintain the desired temperature in absorber 11, regenerated absorption solution 14 leaving interchanger 24 may be passed through solvent cooler 26 and further cooled by indirect heat exchange with cooling tower water. Use of heat interchanger 24 reduces the energy demands of the system such that use of a solvent heater and/or solvent cooler may not be required.

Sulfate Contaminant Control/Oxidation Suppression

In regenerative processes, there is the potential for accumulation of contaminants in the absorption solution that may interfere with the absorption/stripping operations. The predominant contaminant is sulfate salt along with other sulfur-containing species such as thiosulfates and thionates and acid gases absorbed from the effluent gas to be treated. The sulfur dioxide containing effluent gas often contains some sulfur trioxide as well as sulfuric acid mist. In addition, liquid phase oxidation of absorbed sulfur dioxide in the absorber leads to the formation of sulfuric acid.

Oxidation tends to be highly temperature dependent and increases sharply as the temperature in the absorber increases. The addition of a base (e.g., NaOH) restores the buffer capacity of the absorption solution by neutralizing the sulfuric acid and forming sulfate salts (e.g., $Na_2SO_4$) that accumulate in the absorption solution. Thus, a need persists for a method of treating an aqueous absorption solution used in the regenerative recovery of sulfur dioxide to control sulfate contaminants at an acceptable level with minimal absorbent losses and without considerable consumption of buffering agents or complex process steps that would undermine the economic feasibility of the process.

In accordance with one embodiment of the present invention, sulfate salt contaminant levels in an aqueous absorption solution comprising a salt of a polyprotic carboxylic acid are controlled at an acceptable level by periodically diverting at least a portion of the regenerated absorption solution exiting the stripper for treatment to remove sulfate as a slip stream. Treatment comprises evaporating water from the slip stream to produce a concentrated solution supersaturated in the sulfate salt. Sulfate salt crystals are then precipitated from the concentrated aqueous absorption solution in a crystallizer to form a crystallization slurry comprising precipitated sulfate salt crystals and a mother liquor. Concentration of the aqueous absorption solution can be suitably achieved by heating and/or reducing the pressure to flash evaporate water. Typically, the aqueous absorption solution is heated to a temperature of at least about 40° C., more preferably at least about 60° C. and preferably to the boiling point of the absorption solution in the stripper at the stripper operating pressure, during concentration to inhibit formation and precipitation of sodium sulfate decahydrate or Glauber's salt ($Na_2SO_4.10H_2O$).

As shown in FIG. 1, slip stream 30 of the regenerated absorption solution 14 exiting stripper 20 at a temperature of about 60° C. to about 140° C. can be heated in crystallizer preheater 32 to evaporate water and produce concentrated aqueous absorption solution 34 supersaturated in sulfate salt. Concentrated solution 34 is directed to crystallizer 36 to precipitate sulfate salt crystals from concentrated solution 34 and form a crystallization slurry comprising precipitated sulfate salt crystals and a mother liquor. Crystallizer 36 may be operated at atmospheric pressure or under vacuum. The sulfate crystals can be separated from the mother liquor by conventional solid-liquid separation equipment such as a centrifugal or vacuum filter or centrifuge. Alternatively or in addition, the crystallizer can be designed to continuously decant mother liquor from the crystallization slurry. Crystallizer 36 is operated at temperature and pressure to remove sulfate salt and control sulfate salt concentration in the absorption solution at levels recited hereinbelow.

As shown in FIG. 1, overhead stream 38, which contains the mother liquor, can be directed to the solvent cooler 26 and combined with the remainder of regenerated absorption solution 14 being introduced into the top of absorber tower 11. Furthermore, the sulfate salt crystals may be washed with water and the resulting wash water comprising the polyprotic acid salt absorbent likewise directed to absorber 11. Overhead stream 38 from crystallizer 36 may be condensed and returned to absorber 11. Alternatively, overhead stream 38 from crystallizer 36 may be routed to stripper 20 as a source of stripping steam.

Although the treatment described above is effective for controlling acceptable sulfate salt levels in the circulating absorption solution, in accordance with some embodiments of the present invention, an oxidation inhibitor can be included in the absorption solution to reduce oxidation of bisulfite and sulfite to bisulfate and sulfate contaminants, respectively. There are several different types of oxidation inhibitors that may be useful in the practice of the present invention, including: oxygen scavengers and free radical trappers such as p-phenylenediamine and hydroquinone; inhibitors of $NO_x$-catalyzed oxidation such as ascorbic acid; and chelating agents such as ethylenediaminetetraacetic acid (EDTA) which sequester and inhibit metal-catalyzed oxidation. Such oxidation inhibitors can be employed individually or in various combinations and can be added as needed to the regenerated aqueous absorption solution introduced to the absorber. Depending on the type of inhibitor(s) employed, the concentration in the absorption solution typically ranges from a few ppm to from about 1 to about 10 percent by weight. An excess is typically added (e.g., at least about 1000 ppm) since the inhibitors will gradually be consumed by oxidation. Ascorbic acid and hydroquinone are particularly effective in inhibiting oxidation in a sodium malate absorption solution. EDTA is expected to be effective as an oxidation inhibitor when metals are present in the absorption solution.

Increased acidity in the absorption solution has the effect of increasing sulfur dioxide stripping efficiency. Thus, leaving a small concentration of dissolved sulfur dioxide or sulfate salt in the absorption solution leads to higher efficiency in the stripper. For example, a small concentration of sodium sulfate and/or sulfurous acid in the stripper makes regeneration of the absorbing solution less energy intensive. In accordance with one embodiment of the invention, the concentration of sulfate salt is controlled at from about 0.5 to about 11 weight percent, preferably from about 3 to about 11 weight percent in the absorption solution and a small fraction of sulfur dioxide is left in the regenerated aqueous absorption solution thus making the solution slightly more acidic and consequently making the desorption of sulfur dioxide less energy intensive.

Sulfur Dioxide Recovery/Energy Integration

As noted above, steam is the preferred stripping agent for removing the relatively noncondensable sulfur dioxide absorbed in the sulfur dioxide-enriched solution, although other components such as air or clean exhaust gas may be employed during solvent regeneration. Steam can be supplied by reboiling sulfur dioxide-enriched solution in a stripper reboiler and/or by injecting live steam into the base of a stripper column. Steam provides energy required to heat the sulfur dioxide-enriched solution to desorb the dissolved sulfur dioxide and serves as a diluent for the desorbed gases, which increases the driving force for desorption and sweeps desorbed sulfur dioxide from the stripping tower. Steam is readily separated from the sulfur dioxide-enriched stripper gas by condensation in an overhead condenser. However, such separation of the stripping steam is wasteful since it involves condensing the water vapor and attendant loss of latent heat to the condenser cooling medium (e.g., cooling water) and external energy must be supplied in order to generate additional steam. Accordingly, it is important to reduce the energy requirements of the stripping operation as much as possible.

Energy efficiency of a stripping operation can be improved by use of heat pumps to extract energy from the sulfur dioxide-enriched stripper gas at the condensing temperature and return it to the process in the reboiler. Energy efficiency of a stripping operation can also be improved by the use of a vapor compression technique in which the sulfur dioxide-enriched stripper gas is mechanically compressed and subsequently condensed with recovery of the latent heat for use in reboiling the stripped absorption solution. The use of heat pumps and vapor compression techniques to reduce stripping operation energy requirements is disclosed in U.S. Pat. No. 4,444,571 (Matson) and U.S. Pat. No. 4,181,506 (Bengtsson).

While a heat pump system can potentially reduce sulfur dioxide stripper energy requirements, such systems are economically viable when the temperature differential between the regenerated sulfur dioxide absorption solution heated in the reboiler and the aqueous condensate from the overhead condenser is no greater than about 20° C. As this temperature differential decreases, heat pump systems become even more attractive in providing energy savings.

An integrated sulfur dioxide stripper and heat pump system capable of providing improved energy efficiency has been devised. In the integrated system, condensation of stripping steam from the sulfur dioxide-enriched stripper gas is split between a high temperature overhead condenser and a subsequent condenser operated at a lower temperature. In the high temperature condenser, most of the water vapor is condensed (and most of the latent heat removed) which represents the main part of the heat of condensation. In order to enhance the energy efficiency of the heat pump system, the temperature of the condensate should be no greater than about 20° C. lower than the temperature in the stripper reboiler. Preferably, more than about 50% of the latent heat is removed in the high temperature overhead condenser without decreasing the temperature of the condensate less than about 20° C. relative to the temperature in the reboiler. Preferably, the differential between the temperature of the condensate produced in the high temperature condenser and the reboiler temperature is no greater than about 15° C., even more preferably, no greater than about 10° C. The gas effluent from the high temperature overhead condenser comprising sulfur dioxide and water vapor gas is subsequently cooled to a temperature normally below about 70° C. by using cooling water or another cooling source where the remaining water is condensed. As compared to conventional approaches, (without splitting the condensation), the temperature differential between the condensate and reboiler can be maintained sufficiently small to allow efficient operation of the heat pump system.

The integrated sulfur dioxide stripper and heat pump system with divided condensation for recovering sulfur dioxide from an aqueous sulfur dioxide-enriched absorption solution is shown in FIG. 1. As described above, sulfur dioxide-enriched solution 16 is heated in sulfur dioxide stripper 20 to desorb sulfur dioxide and produce a regenerated aqueous absorption solution 14 and sulfur dioxide-enriched stripper or overhead gas 23 comprising water vapor. Sulfur dioxide-enriched stripper gas 23 is cooled in high temperature overhead condenser 40 of the sulfur dioxide stripper 20 to condense a portion of the water vapor contained therein and produce high temperature overhead condenser gas effluent 42 comprising sulfur dioxide and residual water vapor and aqueous condensate 44 comprising dissolved sulfur dioxide. A portion of the regenerated absorption solution 14 collected in the sump of stripper tower 20 is heated in reboiler 46 of sulfur dioxide stripper 20.

As shown in FIG. 1, an integrated heat pump system comprising a compressor/expansion valve assembly 48 is associated with high temperature overhead condenser 40 and reboiler 46, wherein high temperature overhead condenser 40 comprises a heat pump system evaporator (not shown) in which a refrigerant or working fluid is evaporated upon heat transfer from sulfur dioxide-enriched stripper gas 23 and reboiler 46 of sulfur dioxide stripper 20 comprises a heat pump system condenser (not shown) in which the refrigerant or working fluid is condensed upon heat transfer to regenerated absorption solution 14. As noted above, high temperature overhead condenser 40 is operated to remove more than about 50% of the latent heat while maintaining a temperature differential of no greater than about 20° C. between condensate 44 and reboiler 46. More efficient operation of the heat pump system is attained by maintaining the differential between high temperature condensate 44 and reboiler 46 at no greater than about 15° C., or even more preferably, no greater than about 10° C. (e.g., temperature of condensate 44 is about 100° C. and the temperature of reboiler 46 is about 106° C.).

Aqueous condensate 44 from high temperature overhead condenser 40 is fed to condensate stripper or water column 50 and heated (e.g., with steam or a second reboiler (not shown), to desorb sulfur dioxide and produce condensate stripper gas 53 comprising water vapor and sulfur dioxide desorbed from aqueous condensate 44. Condensate stripper gas 53 exiting the top of condensate stripper column 50 is combined with high temperature overhead condenser gas effluent 42 and cooled in low temperature condenser 54 (e.g., with cooling water at 50° C.) to condense water vapor and produce recovered sulfur dioxide stream 56 comprising sulfur dioxide obtained in aqueous condensate 44 and in high temperature overhead condenser gas effluent 42. Stripped condensate effluent 58 depleted in sulfur dioxide exits the bottom of condensate stripper column 50 and may be combined with regenerated absorption solution 14 and returned to absorber 11 or fed to the base of stripper 20, or optionally a portion may be purged from the system.

The integrated sulfur dioxide stripper and heat pump system shown in FIG. 1 includes a separate stripper column 20 and condensate stripper column 50. However, it should be understood that the stripper column 20 functions as the stripping section and condensate stripper column 50 functions as the rectification section such that the two columns could alternatively be integrated in a single column where the sulfur dioxide-enriched solution 16 is fed a few trays below the low temperature condenser 54.

In accordance with an alternative embodiment of the present invention, a vapor compression technique is utilized in conjunction with splitting the condensation of the stripping steam from the sulfur dioxide-enriched stripper gas between the reboiler of the sulfur dioxide stripper and a subsequent condenser operated at a lower temperature. This vapor compression embodiment also provides enhanced energy efficiency, but as compared to the integrated sulfur dioxide stripper and heat pump system embodiment shown in FIG. 1, this alternative embodiment can reduce capital cost by eliminating the high temperature overhead condenser and compressor/expansion valve assembly.

Figure 2:
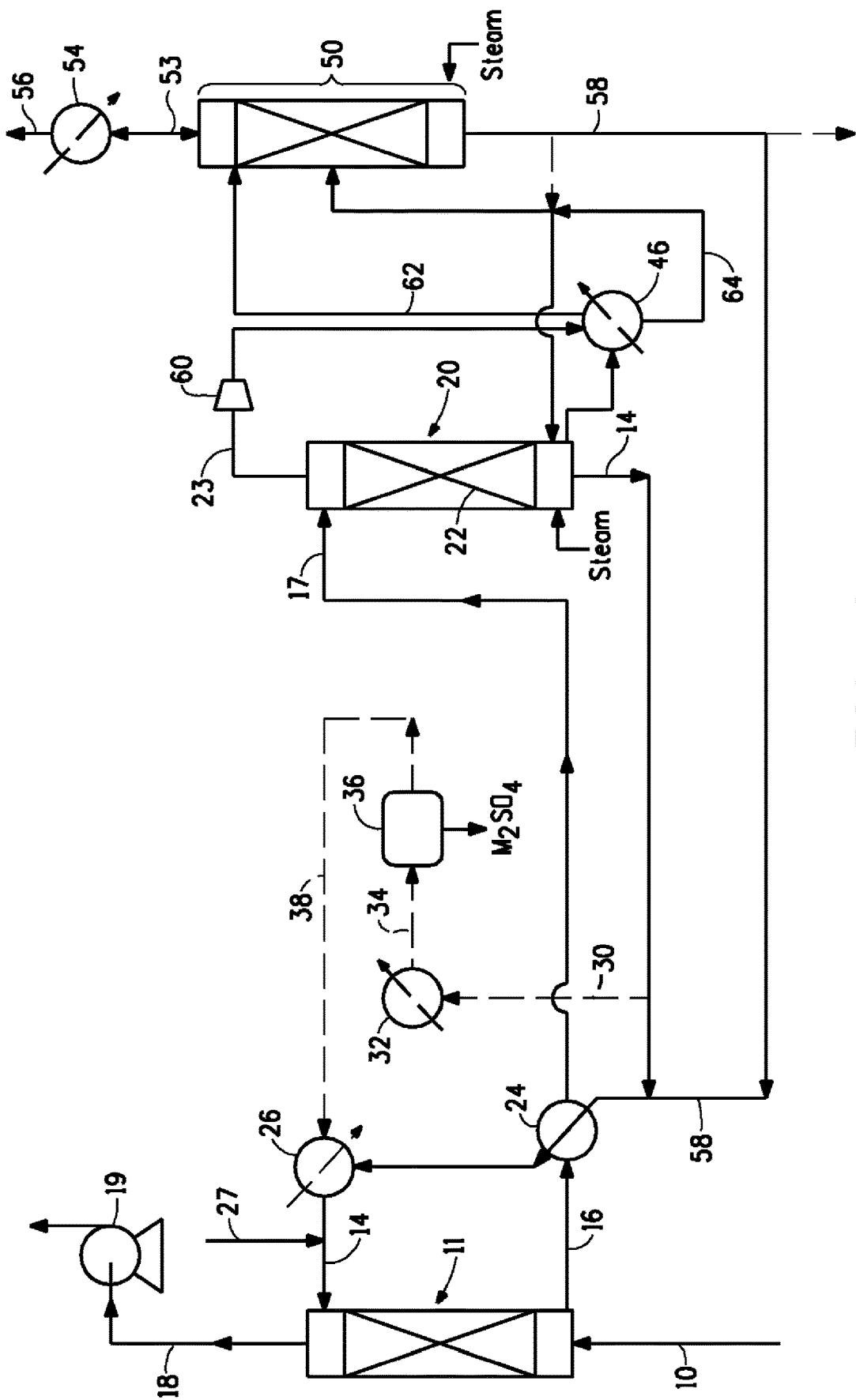
FIG. 2 is a schematic flow sheet illustrating another embodiment of the process of the present invention for selectively removing and recovering sulfur dioxide from a sulfur dioxide-containing effluent gas utilizing vapor compression.

The embodiment utilizing vapor compression and divided condensation for recovering sulfur dioxide from an aqueous sulfur dioxide-enriched absorption solution is shown in FIG. 2, where numbers not described hereinbelow have the same meaning as the numbers in FIG. 1. As described above, sulfur dioxide-enriched solution 16 is heated in sulfur dioxide stripper 20 to desorb sulfur dioxide and produce regenerated aqueous absorption solution 14 and sulfur dioxide-enriched stripper or overhead gas 23 comprising water vapor. The pressure of sulfur dioxide-enriched stripper gas 23 exiting stripper 20 is increased, for example, by mechanical compression in compressor 60. Alternatively, if higher pressure steam is available, a steam ejector or similar device (not shown) may be used to increase the pressure of sulfur dioxide-enriched stripper gas 23. Typically, the pressure increase is from about 45 kPa to about 65 kPa. Furthermore, it is typically preferred to operate stripper 20 at lower pressures (e.g., under vacuum) to increase the relative volatility of sulfur dioxide with respect to water and enhance desorption (e.g., less theoretical stages needed for a given reflux). In addition lower pressures lead to lower temperatures in the system allowing the use of lower pressure steam for heating sulfur dioxide-enriched solution 16. However, vacuum operation of stripper 20 increases the diameter of stripper 20 and associated capital cost. By way of example, operating stripper 20 under a slight vacuum (e.g., −35 kPa gauge) and modestly increasing the pressure of sulfur dioxide-enriched stripper gas 23 exiting stripper 20 (e.g., to about 20 kPa gauge) will represent one economic approach. Nevertheless, operating stripper 20 at or above atmospheric pressure may also be an attractive approach. Economic optimization may determine the specific operating conditions.

The pressurized flow of sulfur dioxide-containing gas 61 is directed to reboiler 46 where a substantial portion of the steam is condensed and the latent heat is transferred to heat a portion of regenerated absorption solution 14 collected in the sump of stripper tower 20. In reboiler 46, most of the water vapor is condensed (and most of the latent heat removed) which represents the main part of the heat of condensation. Preferably, more than about 50% of the latent heat is removed in reboiler 46. Reboiler gas effluent 62 comprising sulfur dioxide and residual water vapor gas is removed from reboiler 46 and subsequently cooled to a temperature normally below about 70° C. by using cooling water or another cooling source where the remaining water is condensed. Aqueous condensate 64 comprising dissolved sulfur dioxide from reboiler 46 is fed to condensate stripper or water column 50 and heated (e.g., with steam or a reboiler, not shown) to desorb sulfur dioxide and produce condensate stripper gas 53 comprising water vapor and sulfur dioxide desorbed from aqueous condensate 64. Condensate stripper gas 53 exiting the top of condensate stripper column 50 is combined with reboiler gas effluent 62 and cooled in low temperature condenser 54 (e.g., with cooling water at 50° C.) to condense water vapor and produce recovered sulfur dioxide stream 56 comprising sulfur dioxide obtained in aqueous condensate 64 and in reboiler gas effluent 62. Stripped condensate effluent 58 depleted in sulfur dioxide exits the bottom of condensate stripper column 50 and may be combined with regenerated absorption solution 14 and returned to absorber 11 or fed to the base of stripper 20, or optionally a portion may be purged from the system.

Simultaneous Removal of Sulfur Dioxide and $NO_x$ $NO_x$ emissions are present in most of the effluent gases where sulfur dioxide is also present. $NO_x$ is frequently present in concentrations lower than sulfur dioxide. By "$NO_x$" is meant herein one or more nitrogen oxides, such as nitric oxide (NO), and nitrogen dioxide ($NO_2$). Nitric oxide slowly reacts with oxygen forming nitrogen dioxide. The oxidation of nitric oxide to nitrogen dioxide is strongly favored by lower temperatures such that the reaction rate increases as the temperature is lowered. At room temperatures the ratio of NO to $NO_2$ approaches one. At higher temperatures, nitric oxide is present in a higher ratio.

A further aspect of the regenerative recovery of sulfur dioxide in accordance with another embodiment of the present invention is the simultaneous removal of sulfur dioxide and $NO_x$ from a sulfur dioxide-containing effluent gas, which comprises $NO_x$. Ascorbic acid increases the absorption of any nitrogen dioxide in the absorption solution. It is believed that polyprotic carboxylic acids and salt absorbents (e.g., sodium malate) will also increase the absorption of $NO_2$ in an analogous manner to the absorption of sulfur dioxide. The addition of metals such as $Fe^{+2}$ or $Co^{+2}$ in the presence of a polybasic chelating acid (e.g., EDTA) leads to the formation of a metal complex that is particularly effective in absorbing nitric oxide. The ascorbic acid, polybasic acid and active metal can be added as needed to the regenerated polyprotic carboxylic acid salt absorption solution introduced to the absorber. Once both nitrogen dioxide and nitric oxide are absorbed in the absorption solution, a sufficient residence time is provided to allow the oxidation of bisulfite to bisulfate and the reduction of nitric oxide and nitrogen dioxide to nitrogen. By selecting the appropriate concentrations of ascorbic acid, metal chelating agent and active metal and by allowing the reaction to take place the process of the present invention can be configured to remove nitric oxide and nitrogen dioxide.

FIG. 1 shows a potential process diagram for the simultaneous removal of sulfur dioxide and the reaction of $NO_x$ to nitrogen and sodium sulfate. In particular, $NO_x$ reactor 15 receives at least a portion of the sulfur dioxide-enriched solution 16 comprising a salt of a polyprotic carboxylic acid, ascorbic acid and a metal chelate or metal complex comprising a chelating agent and a metal cation. Suitable chelating agents include ethylenediaminetetracarboxylic acid (e.g., EDTA) or other polybasic acid. Reactor 15 provides sufficient residence time for the reduction of nitric oxide and nitrogen dioxide to nitrogen. Any sulfate formed is removed in crystallizer 36. This approach is particularly attractive since it allows the simultaneous removal of two air pollutants using one system.

The recovered sulfur dioxide stream 56 may be used to prepare elemental sulfur by the Claus process or further cooled to condense sulfur dioxide in the form of a liquid product. For example, the sulfur dioxide-containing effluent gas may comprise the gaseous effluent from the incinerator of a Claus plant and the recovered sulfur dioxide stream may be recycled to the inlet of the Claus incinerator. Alternatively, the recovered sulfur dioxide may be fed to a contact sulfuric acid plant such that the sulfur dioxide contained in the stripper gas is ultimately recovered as concentrated sulfuric acid and/or oleum. The process of the present invention is particularly useful in altering the composition of a effluent gas relatively weak in sulfur dioxide (e.g., about 0.01 to about 5 percent by volume) and having a $H_2O/SO_2$ molar ratio greater than the molar ratio of $H_2O/SO_3$ in the desired acid product so as to provide a sulfur dioxide-enriched gas having a composition suitable for ultimate conversion to concentrated sulfuric acid and/or oleum in a contact sulfuric acid plant.

EXAMPLES

The following Examples are simply intended to further illustrate and explain the present invention. The Examples, therefore, should not be regarded as limiting the scope of the invention or manner in which it may be practiced.

Example 1

Batch Absorber Experiments

Figure 3:
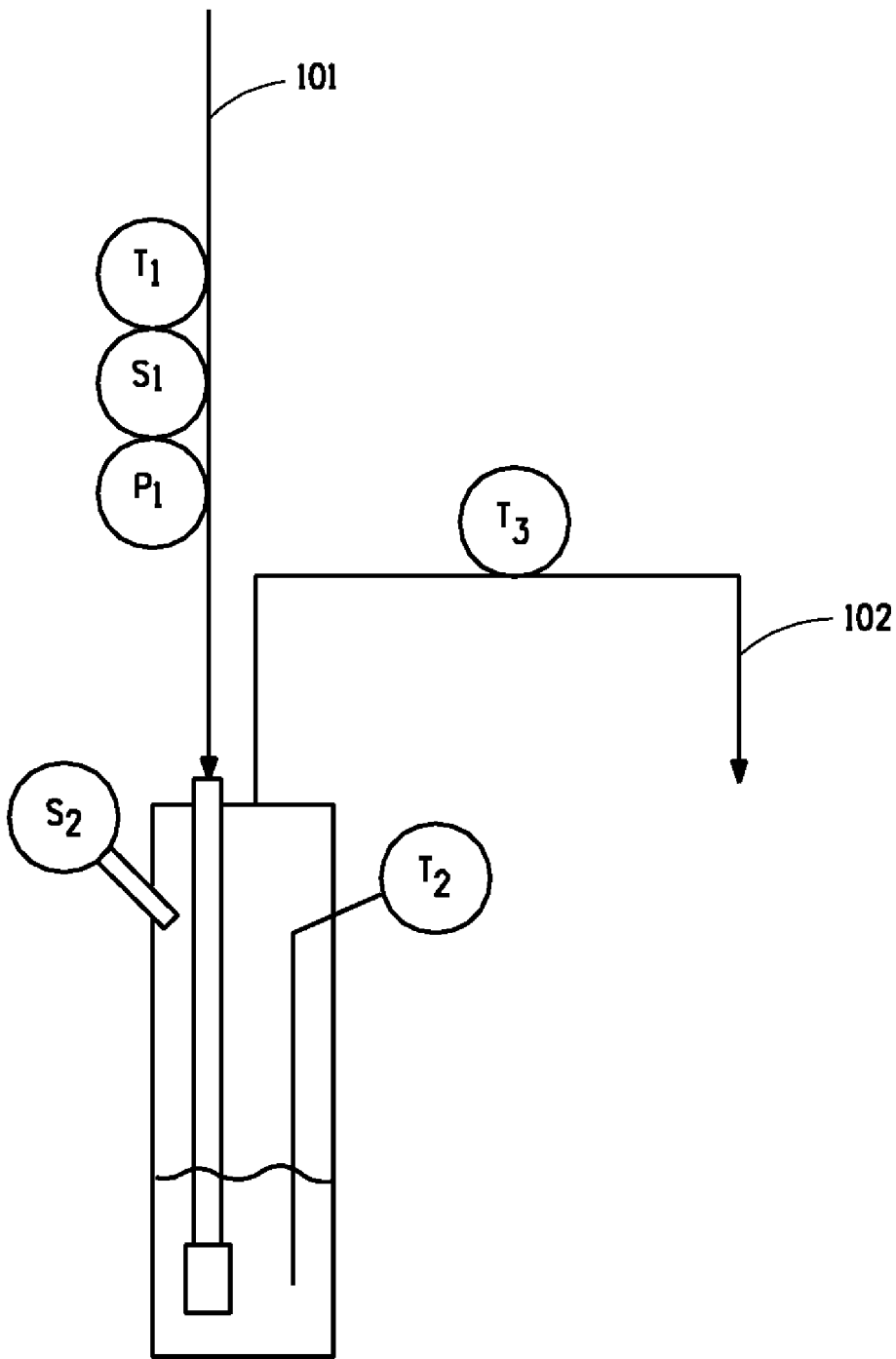
FIG. 3 is a schematic flow sheet of the apparatus used in the batch absorber experiments described in Example 1.

The following experiments were conducted in a batch absorber wherein a sulfur dioxide-containing gas was fed via a sparger below the liquid level in a vessel containing an aqueous absorption solution comprising various polyprotic carboxylic acid salts and the composition of the exhaust gas was monitored. A schematic of the experimental apparatus is shown in FIG. 3.

The sulfur dioxide-containing inlet gas 101 to be treated comprised nitrogen saturated with water vapor and a controlled concentration of sulfur dioxide. Temperatures (T) and pressure (P) were monitored during the experiment and gas samples (S) were taken at different times during the experiment. $T_1$ and $P_1$ are temperature and pressure sensors of inlet gas 101. $S_1$ is a sampling point for inlet gas 101. $T_2$ is a temperature sensor of the liquid in the vessel. $T_3$ is a temperature sensor of exhaust gas 102.

In these experiments and other experiments reported in the Examples below, the gas concentrations were measured by gas chromatography and liquid concentrations were calculated by material balance.

Figure 4:
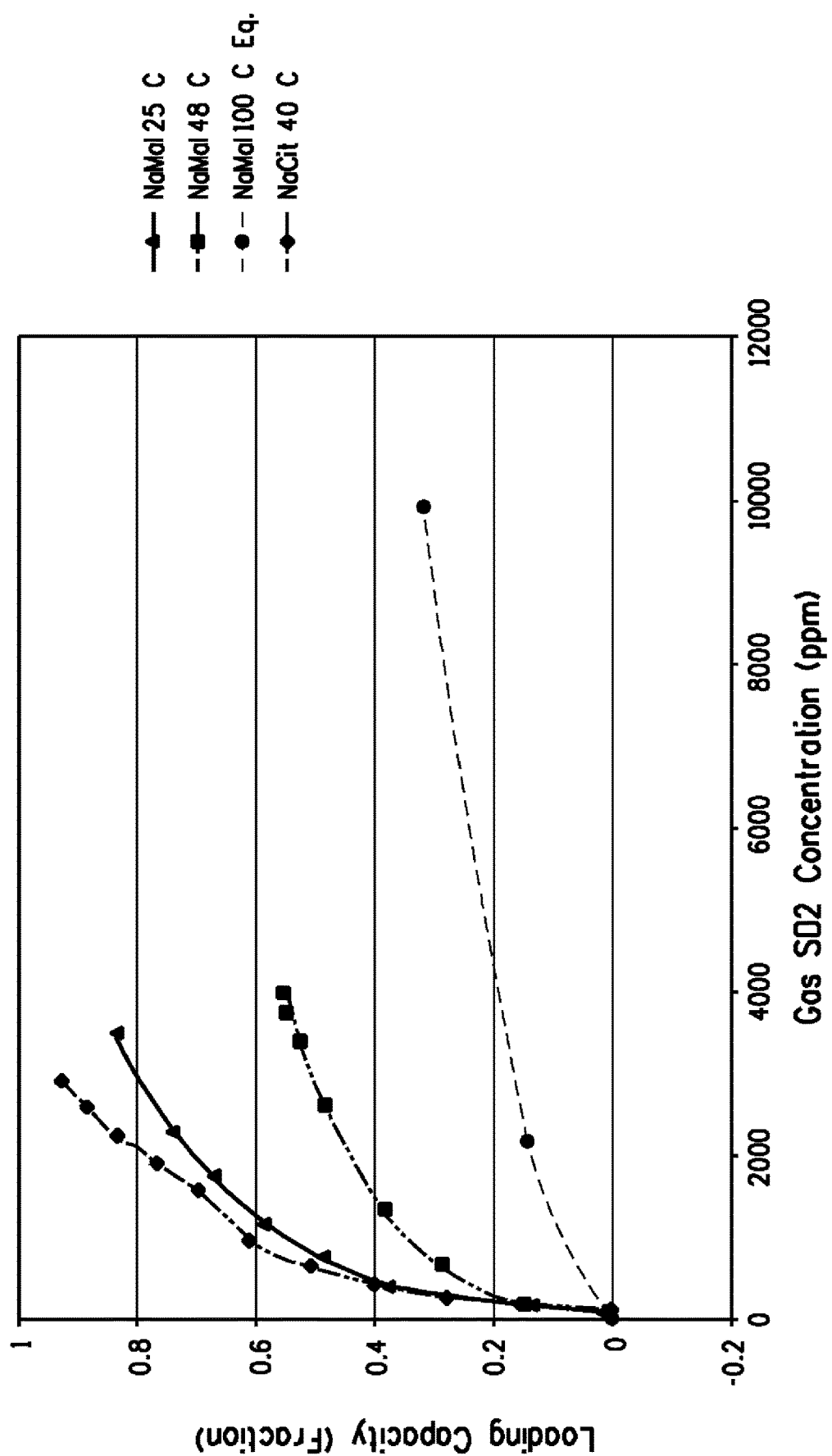
FIG. 4 is a graph of the molar ratio of sulfur dioxide absorbed per mole of carboxylic acid salt as a function of the concentration of sulfur dioxide in the gas phase for various carboxylic acid salts investigated in the batch absorber experiments described in Example 1.

The graph in FIG. 4 shows selected results from the batch absorber experiments at various conditions for absorption solutions comprising sodium malate (Na Mal) and sodium citrate (Na Cit). These results are expressed as molar ratio of sulfur dioxide absorbed per mole of carboxylic acid salt as a function of the concentration of sulfur dioxide in the gas phase. The temperatures for these batch experiments ranged from 25° C. to 100° C., as shown in FIG. 4 per the legend. All experiments were performed at atmospheric pressure. These experiments approach equilibrium concentrations and, in some cases, equilibrium data (denoted Eq. in the legend) are also included in the graphed results. For the equilibrium data, the compositions of the gas and liquid were diluted with excess caustic to maintain the sulfur dioxide in solution.

Additional results for equilibrium data for salts are provided in Table 2.

TABLE 2

Equilibrium Loading Data for Metal Salts

| Metal salt | Loading Capacity (fraction) | Temperature (° C.) | $SO_2$, ppm |
|---|---|---|---|
| Na Mal | 0.1694 | 50 | 406.6 |
| Na Mal | 0.1416 | 100 | 2169.06 |
| K Cit | 0.2668 | 100 | 1162.54 |
| K Cit | 0.2754 | 50 | 105.94 |
| Na Suc | 0.2053 | 100 | 1387.3 |
| Na Suc | 0.1045 | 50 | 137.54 |
| Na Pha | 0.7250 | 100 | 11303.83 |
| Na Pha | 0.6530 | 50 | 1115.92 |

Na = sodium;
K = potassium;
Mal = malate;
Cit = citrate;
Suc = succinate;
Pha = phthalate.

Total sulfur content was determined using ASTM Standard D1552, "Standard Test Method for Sulfur in Petroleum Products (High-Temperature Method", DOI: 10.1520/D1552-08, available from ASTM International, West Conshohocken, Pa., www.astm.org.

A good absorbing system is one that shows a good dependence of solubility or loading as a function of temperature.

Example 2

Absorber Column Experiments

In the following experiments a gas comprising nitrogen and oxygen saturated with water and containing sulfur dioxide was contacted with an absorption solution in a counter current absorber column.

Figure 5:
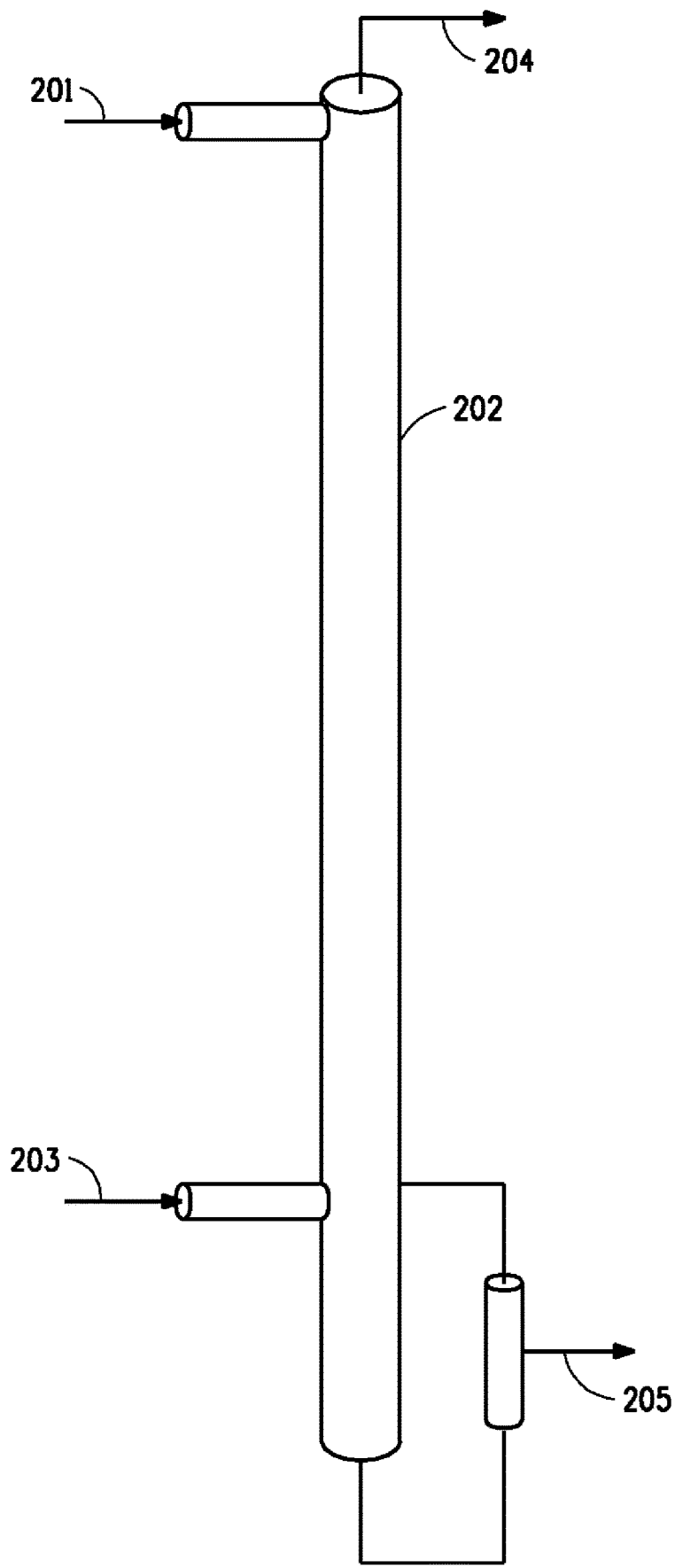
FIG. 5 is a schematic flow sheet of the apparatus used in the absorber column experiments described in Example 2.

A schematic of the experimental apparatus is shown in FIG. 5. Fresh absorption solution 201 was introduced to absorber column 202. Counter current absorber column 202 was equipped with 1.92 meters (75.5 inches) of structured packing and was operated at a temperature of 33.4° C. and at atmospheric pressure (1 atm=101.3 kPa). Inlet gas 203 was introduced to the bottom of absorber column 202. Exhaust gas 204 was removed from the top of absorber column 202. The compositions of inlet gas 203 and exhaust gas 204 were monitored and are reported in Table 3. Fresh absorption solution 201 comprised an aqueous solution of sodium malate and ascorbic acid as an oxidation inhibitor. In the experiments, gas samples could be taken along absorber column 202 via various sampling ports (not shown), to follow the decrease of sulfur dioxide concentration throughout the column. Sulfur-dioxide enriched absorption solution 205 was removed from the bottom of absorber column 202. A small concentration of sulfur dioxide in the liquid phase was present reflecting partial stripping during regeneration of sulfur dioxide-enriched absorption solution 205.

TABLE 3

Absorber Column Experiments

| Inlet Gas Component | Conc., mol % | |
|---|---|---|
| Water | 1.20 | |
| N2 | 90.84 | |
| O2 | 6.00 | |
| $SO_2$ | 1.96 | |
| TOTAL | 100.00 | |
| Gas Flow, liter/hr | 2,632 | |
| Gas Flow, ft³/hr | 93 | |
| Absorbing Liquid In | Conc., mol % | Conc., mass % |
| Water | 90.21 | 69.60 |
| Malic Acid | 3.10 | 17.80 |
| NaOH | 6.20 | 10.62 |
| $SO_2$ | 0.36 | 0.99 |
| Ascorbic Acid | 0.13 | 0.99 |
| TOTAL | 100.00 | 100.00 |
| Liquid flow, g/hr | 4,395 | |
| Outlet Gas | | |
| $SO_2$ Concentration, ppm | 39 | |
| $SO_2$ Removal, % | 99.80 | |
| Absorbing Liquid Out | | Conc., mass % |
| $SO_2$ in liquid | | 4.41 |

The results of this experiment show a 99.8% removal of the sulfur dioxide from the inlet gas. The sulfur dioxide concentration decreased from 2 mole % to 39 ppm after treatment. The concentration of sulfur dioxide in the outlet liquid was about 4.4 weight %.

Example 3

Stripper Experiments

In the following experiments a sulfur dioxide-enriched absorption solution was stripped to remove sulfur dioxide by heating the solution.

Figure 6:
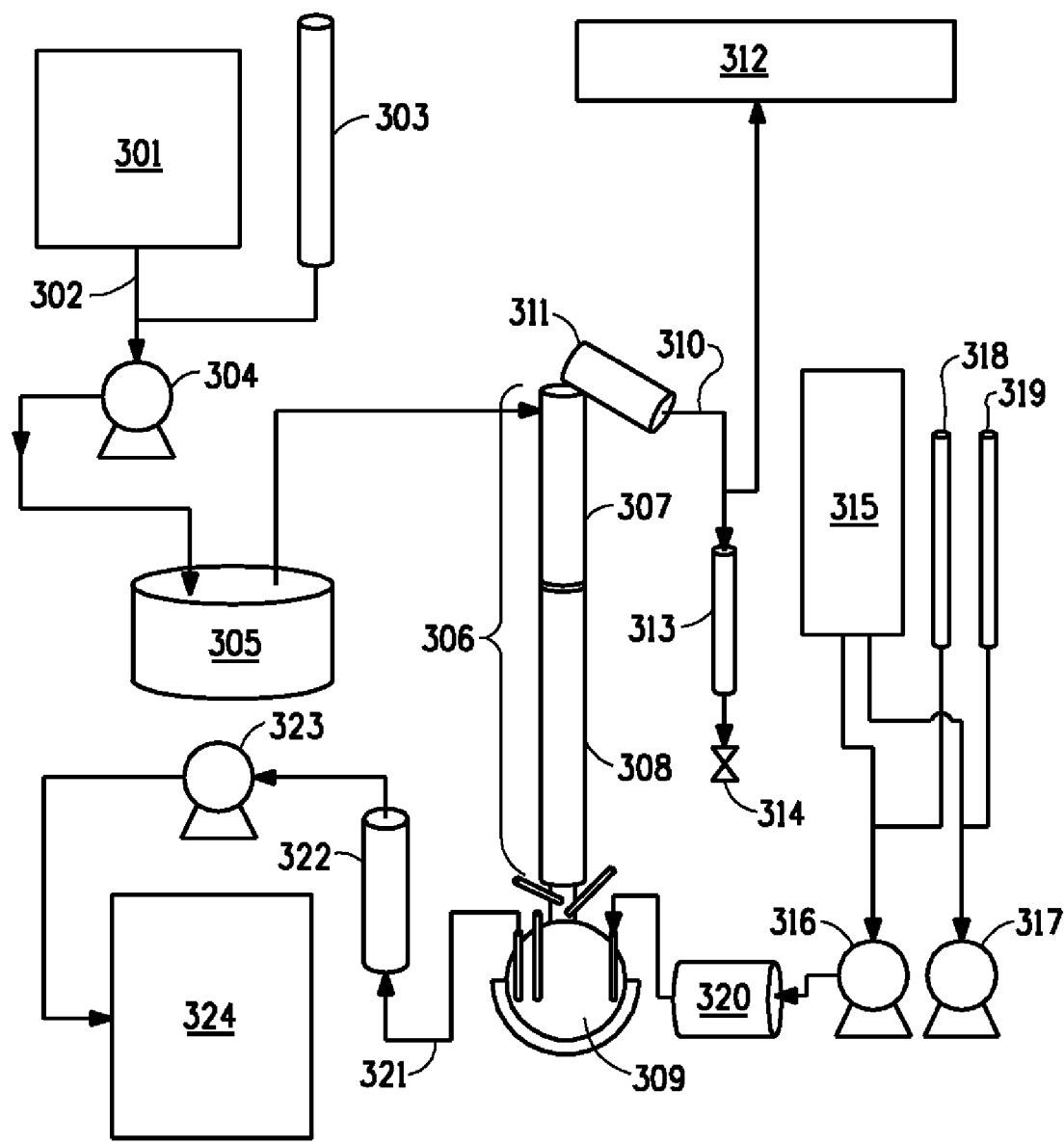
FIG. 6 is a schematic flow sheet of the apparatus used in the stripper experiments described in the Example 3.

A schematic of the experimental apparatus is shown in FIG. 6. Feed reservoir 301 contains sulfur dioxide-enriched absorption solution 302 collected during the absorption experiments. Absorption solution 302 comprised an aqueous solution containing 24% sodium malate and 3.7 weight % sulfur dioxide by weight. Absorption solution 302 was fed as monitored by burette 303 at a rate of 47.2 grams/minute using first positive displacement pump 304 to stripper column 306. Absorption solution 302 was pumped through first pump 304 and preheated in hot bath 305 and fed to stripper column 306 consisting of 35 trays. The top portion 307 of stripper column 306 contained 25 trays (stages) and the bottom portion 308 of stripper column 306 contained 10 trays (stages).

Stripper column 306 was operated at atmospheric pressure (1 atm=101.3 kPa) and positioned above kettle 309. Kettle 309 and product overhead 310 temperatures were maintained at 105° C. and 100.2° C., respectively. Product overhead 310 comprised liquid and gas at a liquid flow rate of 22.1 grams/min of an aqueous solution containing 3 wt % sulfur dioxide and a gas flow rate of 1.45 g/min of a mixture containing 43% sulfur dioxide and 57% water. Temperature and pressure were measured and samples taken at various sampling points (not shown). Product overhead 310 was condensed in condenser 311, which was connected to vacuum 312. Exhaust gas (not shown) was subject to scrubbing and trapping. Liquid product was collected in vessel 313 for storing or recycling through valve 314.

Water, from water reservoir 315, which is the stripping agent, was fed to kettle 309 of stripper column 306 through pumps 316 and 317 at a rate of 24.5 grams/min, as monitored by burettes 318 and 319. Water was heated at heat exchanger 320 using heat tape. Treated absorption solution 321 was removed from kettle 309 at a rate of 48.2 grams/min having a residual concentration of 0.93 weight % sulfur dioxide through cooler 322 and pump 323 to absorption solution collection reservoir 324. This represented a 74% recovery of the sulfur dioxide fed to the column. The results are reported in Table 4.

TABLE 4

| Stripper Experiments | |
|---|---|
| Stripper Feed | |
| Feed Flow, g/min | 47.2 |
| SO$_2$ concentration in feed, wt % | 3.7 |
| Sodium Malate, wt % | 24.1 |
| Water, wt % | 72.2 |
| Overhead Liquid Make | |
| Overhead make, g/min | 22.1 |
| SO$_2$ Concentration, wt % | 3.0 |
| Water Feed to Kettle | |
| Water Feed to the kettle, g/min | 24.5 |
| Liquid Make Flow from Kettle | |

TABLE 4-continued

| Stripper Experiments | |
|---|---|
| Liquid Make Flow from Kettle, g/min | 48.2 |
| Base concentration, SO$_2$ wt % | 0.93 |
| Sodium Malate, wt % | 24.8 |
| Water, wt % | 74.3 |
| Gas Flow | |
| Gas flow, g/min | 1.45 |
| SO$_2$ flow, g/min | 0.63 |
| Water flow, g/min | 0.82 |
| SO$_2$ Concentration, wt % | 43 |
| SO$_2$ Recovery, % | 74 |
| Base temperature, ° C. | 105.0 |
| Head temperature, ° C. | 100.2 |

Example 4

Crystallization Experiments

The following experiments were conducted in a batch crystallizer used to reduce the concentration of sodium sulfate formed by oxidation in an aqueous absorption solution comprising sodium malate. Water was removed from the kettle of a crystallizer by evaporation either under vacuum (4.4 psia, 0.3 atm, 30.3 kPa) at 75° C. or at atmospheric pressure (14.7 psia, 1 atm, 101.3 kPa) at 106° C. The solids were separated (after evaporation and crystallization) from the liquid using a centrifugal filter. The initial composition of the aqueous absorption solution and the crystallization conditions are set forth in Table 5.

TABLE 5

| Crystallization Experiments | | |
|---|---|---|
| Feed Component | Vacuum Conc., wt % | 1 Atm Press. Conc., wt % |
| Sodium Sulfate | 7 | 7 |
| Sodium Malate | 25 | 25 |
| Water | 68 | 68 |
| Crystallizer Temperature, ° C. | 75 | 104-109 |
| Crystallizer Final Pressure, kPa | 4.4 | 14.7 |
| Initial Crystallization Temperature (ICT), ° C. | 75 | 106 |
| Total feed charged, gms | 755.0 | 720.3 |
| Sodium Sulfate, gms | 52.9 | 50.4 |
| Sodium Malate, gms | 188.8 | 180.1 |
| Water, gms | 513.3 | 489.8 |
| % Water removed at ICT | 36 | 36 |
| Concentration of malate at ICT, % | 33 | 33 |
| Total water evaporated, gms | 330.2 | 323.1 |
| % Water evaporated | 64 | 66 |
| Sulfate recovered, gms | 36.9 | 36.7 |
| % Sulfate recovered | 72 | 73 |
| Malate content of final cake, gms | 1.3 | 1.0 |
| % Malate (lost with sulfate) | 0.7 | 0.6 |

About 64% of the water was removed in the vacuum experiment and about 66% of the water was removed in the atmospheric experiment. About 72% of the anhydrous sodium sulfate was removed from the original absorption solution and less than 1% of the sodium malate was lost with the sodium sulfate removed.

Example 5

Continuous Absorber and Stripper Experiments

In the following experiments a sulfur dioxide-containing gas was fed to an absorber column and contacted with an aqueous absorption solution comprising sodium malate and ascorbic acid as an oxidation inhibitor to produce an exhaust gas from which sulfur dioxide had been removed and a sulfur dioxide-enriched absorption solution which was then continuously regenerated in a stripper and returned to the absorber column.

Figure 7A:
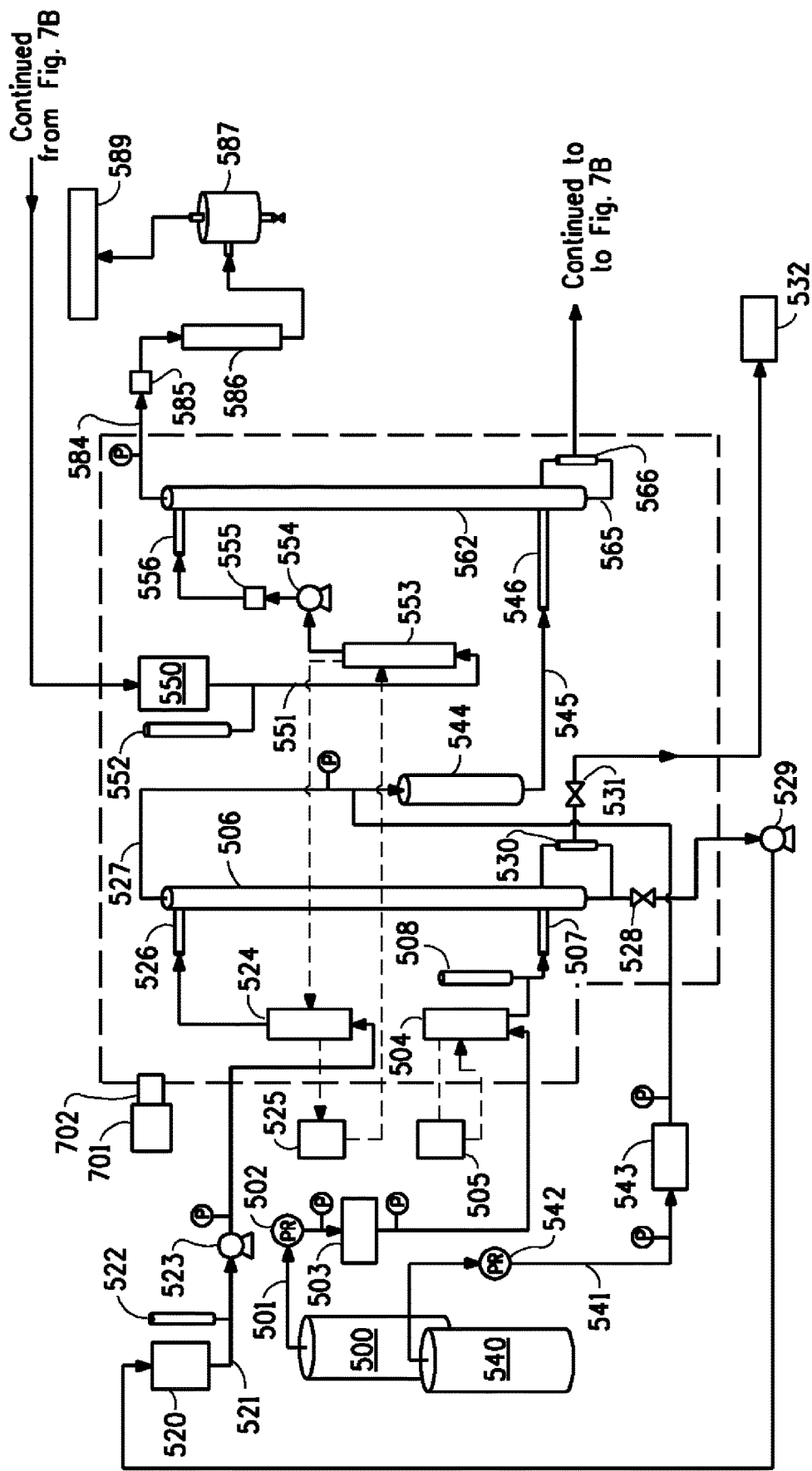
FIG. 7a is a schematic flow sheet of a portion of the apparatus used in the continuous absorber and stripper experiments described in Example 5, illustrating the apparatus through the absorber.
Figure 7B:
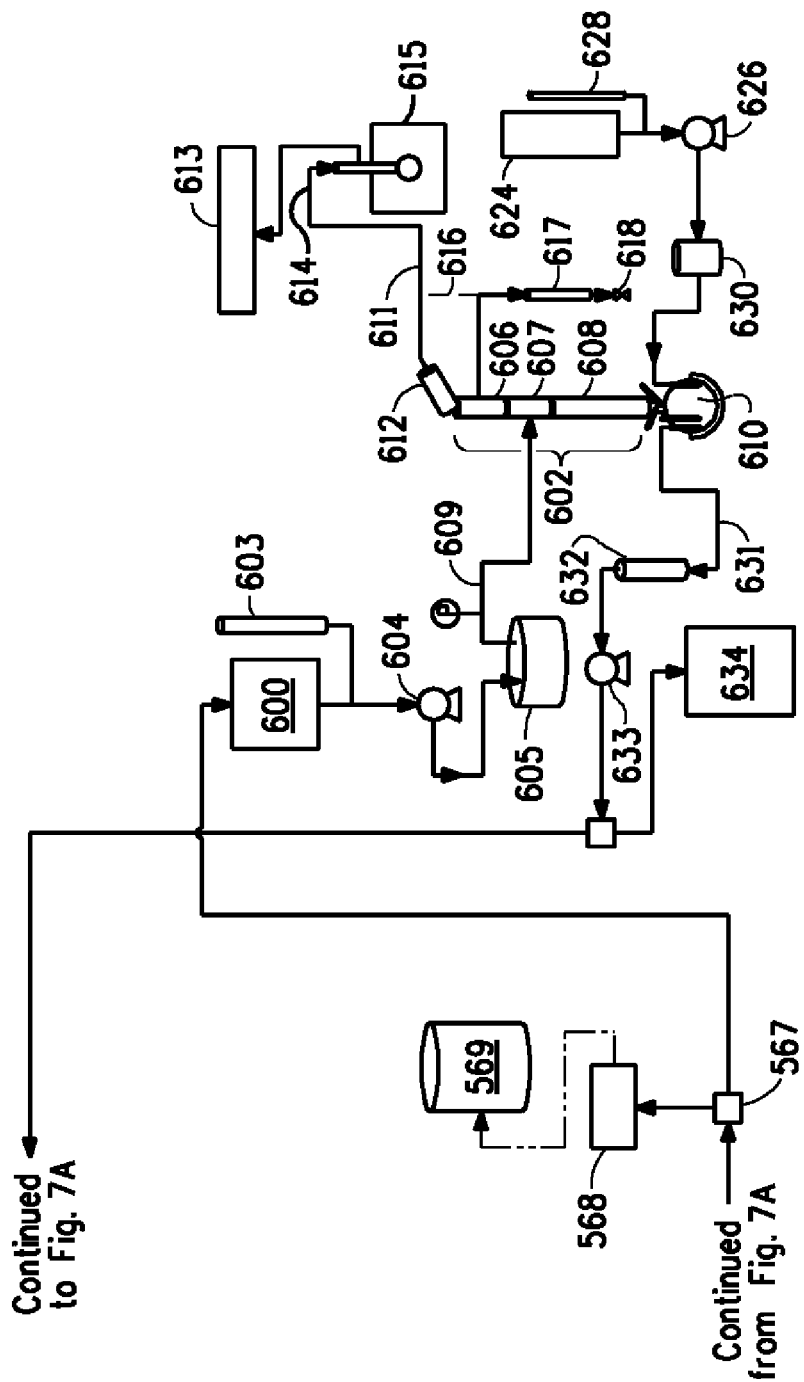
FIG. 7b is a schematic flow sheet of a portion of the apparatus used in the continuous absorber and stripper experiments described in Example 5, illustrating the apparatus after the absorber through to the stripper.

A schematic of the continuous absorber and stripper system used in this Example is shown in FIGS. 7a and 7b. FIG. 7a shows the operation of the system and the configuration and connections between the absorber up through the absorber. The system is continued in FIG. 7b after the absorber to the stripper, wherein the separation of the figure is for clarity purposes. The absorption solution was used to remove sulfur dioxide from the inlet gas and then was regenerated in the stripper. Each component designated "P" is a pressure gauge used to monitor pressure in the system.

Both absorber 562 and stripper 602 were operated at atmospheric pressure (1 atm, 101.3 kPa). Nitrogen gas (containing about 8% oxygen) 501 was fed from nitrogen reservoir 500 through compressor 502 and mass flow controller 503 and then preheated by heat exchanger 504 connected to hot water bath 505 and fed to water saturator 506 through nitrogen gas inlet 507, protected by pop valve 508. Water 521 was fed from water reservoir 520 as monitored by burette 522 through pump 523 to heat exchanger 524 which is connected to hot water bath 525 through water inlet 526 to top of water saturator 506. Nitrogen gas 501 is saturated with water 521 in water saturator 506 to provide water-saturated nitrogen gas 527.

Water may be recycled from bottom of water saturator 506 through valve 528 and pump 529 back to water reservoir 520. Alternatively, water may be recirculated to water saturator through conduit 530. Still another alterative is to remove water from the system through valve 531 and drain 532.

Sulfur dioxide gas 541 was fed from sulfur dioxide reservoir 540 through compressor 542 and mass flow controller 543 to combine with water-saturated nitrogen gas 527 and mixed in static mixer 544 to reach the desired concentration of sulfur dioxide in sulfur-dioxide-containing absorber inlet gas 545.

Sodium malate/water absorption solution 551 was fed from sodium malate/water feed tank 550 as monitored by burette 552 to heat exchanger 553, which was connected to hot water bath 525, and then through pump 554 and valve 555, through solution inlet 556 to top of absorber column 562.

Sulfur dioxide-containing gas 545 was fed through gas inlet 546 and contacted in countercurrent fashion with absorption solution 551, which was fed through solution inlet 556 to absorber column 562 equipped with 1.92 meters (75.5 inches) of structured packing and maintained at a constant temperature of 30° C. using a heated box (not shown). The temperature was measured along absorber column 562 and samples could be collected along absorber column 562 to monitor the sulfur dioxide concentration (not shown).

The flow rate of sulfur dioxide-containing gas 545 to absorber column 562 was 24.3 g/min. This flow rate was sufficient to treat the gas flow of 6,311 standard liters per hour (l/hr) and to lower the concentration of sulfur dioxide in the sulfur dioxide-containing gas 545 (inlet gas) from 2,600 ppm to about 8.5 ppm in exhaust gas 584. The absorption solution removed 99.5% of the sulfur dioxide in the inlet gas.

Sulfur-dioxide enriched absorption solution 565 containing the absorbed sulfur dioxide may be circulated back to absorber column 562 through conduit 566 or through valve 567 to either collection reservoir 568 or to feed reservoir 570. Solution 565 may be stored in collection container for $SO_2$-rich organic salt solution 569. Absorber column 562 operates using vacuum 589. Vacuum 589 may be used to control removal of exhaust gas 584 from absorber column 562 through valve 585 to condenser 586 and liquid cooler 587.

Sulfur dioxide in the enriched absorption solution 565 was removed and the solution regenerated in stripper 602 equipped with 45 sieve trays. Sulfur-dioxide enriched absorption solution 565 containing the absorbed sulfur dioxide was supplied to and collected in feed reservoir 600, then preheated and fed to the top of stripper column 602. Sulfur-dioxide enriched absorption solution 565 was fed from feed reservoir to pump 604 as monitored by burette 603 to be heated by hot water bath 605. Heated absorption solution 609 was fed to stripper column 602 having top dividing head 606, middle feed section 607 and lower tray section 608 having 20 trays (stages).

Stripper column 602 was positioned above kettle 610. Product overhead 611 comprised liquid and gas. Temperature and pressure were measured and samples taken at various sampling points (not shown). Product overhead 611 was condensed in condenser 612, which was connected to vacuum 613. Exhaust gas 614 passed through hydrogen peroxide/ice trap 615. Liquid product 616 was collected in vessel 617 for storing or recycling through valve 618.

Water, from water reservoir 624, which is the stripping agent, was fed to kettle 609 of stripper column 602 through pump 626, as monitored by burette 628 to maintain the water concentration throughout the column 602. Water was heated using heat exchanger 630 with heat tape. A portion of sulfur dioxide absorption solution 631 was removed from kettle 609 through condenser 632 and pump 633 through valve 635 to absorption solution collection reservoir 634. Alternatively, a portion of sulfur dioxide absorption solution 631 could be transferred through pump 633 and valve 635 to sodium malate/water feed tank 550.

Stripper column 602 and kettle 609 were operated such that the temperature in the base of stripper column 602 was 106.4° C. and 100.2° C. at the top of stripper column 602.

Exhaust gas stream 614 and liquid product 616 were removed from the top of stripper column 602. Gas stream 614 had a concentration of about 62% sulfur dioxide and liquid product 616 had a concentration of 0.93 weight % sulfur dioxide. The portion of sulfur dioxide absorption solution 631 containing 0.53 weight % sulfur dioxide was removed from kettle 610 and subsequently fed to absorber column 562.

Furnace 703 with burner 701 and duct 702 encloses components from the heat exchangers in advance of water saturator 506 to the outlet of absorber 562 as shown by the dotted outline.

Experimental conditions and results of these experiments are presented in Table 6.

TABLE 6

| Continuous Absorber and Stripper Experiments | |
|---|---|
| Inlet Gas Component | Conc., mol % |
| Water | 1.20 |
| N2 | 90.47 |
| O2 | 8.07 |
| $SO_2$ | 0.26 |

TABLE 6-continued

Continuous Absorber and Stripper Experiments

| | | |
|---|---|---|
| TOTAL | 100.00 | |
| Gas Flow, liter/hr | 6,311 | |
| Gas Flow, ft³/hr | 223 | |

| Absorbing Liquid In | Conc., mol % | Conc., mass % |
|---|---|---|
| Water | 89.31 | 71.47 |
| Malate | 3.50 | 20.84 |
| Na+ | 7.00 | 7.15 |
| SO₂ | 0.19 | 0.53 |
| Ascorbic Acid | 0.002 | 0.008 |
| TOTAL | 100.00 | 100.00 |
| Liquid flow, g/hr | 1,457 | |

Outlet Gas

| | | |
|---|---|---|
| SO₂ Concentration, ppm | 8.5 | |
| SO₂ Removal, % | 99.7 | |

| Absorbing Liquid Out | | Conc., mass % |
|---|---|---|
| SO₂ in liquid | | 3.68 |

Stripper Feed

| | |
|---|---|
| Feed Flow, g/min | 24.3 |
| SO₂ concentration in feed, wt % | 3.68 |
| Sodium Malate, wt % | 27.99 |
| Water, wt % | 71.47 |

Overhead Liquid Make

| | |
|---|---|
| Overhead make, g/min | 20.4 |
| SO₂ Concentration, wt % | 0.93 |

Water Feed to Kettle

| | |
|---|---|
| Water Feed to the kettle, g/min | 25 |

Liquid Make Flow from Kettle

| | |
|---|---|
| Liquid Make Flow from Kettle, g/min | 27.4 |
| Base concentration, SO₂ wt % | 0.53% |
| Sodium Malate, wt % | 24.80% |
| Water, wt % | 74.30% |

Gas Flow

| | |
|---|---|
| Gas flow, g/min | 1.5 |
| SO₂ flow, g/min | 0.902 |
| Water flow, g/min | 0.553 |
| SO₂ Concentration, wt % | 62% |
| SO₂ Recovery, % | 84% |

The concentration of sulfur dioxide in the absorption solution decreased from 3.68 weight % to 0.53 weight %, representing an 84% recovery of sulfur dioxide in the stripper.

In view of the above, it will be seen that the several objects of the invention are achieved and other advantageous results attained.

As various changes could be made in the above processes without departing from the scope of the invention, it is intended that all matter contained in the above description and shown in the accompanying Figures shall be interpreted as illustrative and not in a limiting sense.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. A process for selectively removing and recovering sulfur dioxide from a sulfur dioxide-containing effluent gas, the process comprising:

contacting the sulfur dioxide-containing effluent gas with a buffered aqueous absorption solution comprising sodium malate in a sulfur dioxide absorber, thereby absorbing sulfur dioxide from the sulfur dioxide-containing effluent gas into the buffered aqueous absorption solution and producing an exhaust gas from which sulfur dioxide has been removed and a sulfur dioxide-enriched absorption solution;

heating the sulfur dioxide-enriched absorption solution in a sulfur dioxide stripper to desorb sulfur dioxide and thereby produce a regenerated sulfur dioxide absorption solution and a sulfur dioxide-enriched stripper gas comprising water vapor; and reintroducing the regenerated sulfur dioxide absorption solution to the sulfur dioxide absorber;

wherein the concentration of sodium malate in the aqueous absorption solution ranges from about 1 mole % to about 7 mole %.

2. The process of claim 1 wherein immediately following the step of heating the sulfur dioxide-enriched absorption solution in the sulfur dioxide stripper producing a regenerated sulfur dioxide absorption solution and a sulfur dioxide-enriched stripper gas comprising water vapor and before reintroducing the regenerated sulfur dioxide absorption solution to the sulfur dioxide absorber, the process further comprises cooling the sulfur dioxide-enriched stripper gas in a high temperature overhead condenser of the sulfur dioxide stripper to condense water vapor and produce a high temperature overhead condenser gas effluent comprising sulfur dioxide and water vapor and an aqueous condensate comprising sulfur dioxide;

heating the regenerated sulfur dioxide absorption solution in a reboiler of the sulfur dioxide stripper, wherein the high temperature overhead condenser comprises a heat pump system evaporator in which a refrigerant is evaporated upon heat transfer from the sulfur dioxide-enriched stripper gas and the reboiler of the sulfur dioxide stripper comprises a heat pump system condenser in which the refrigerant is condensed upon heat transfer to the regenerated sulfur dioxide absorption solution and wherein the regenerated sulfur dioxide absorption solution is heated to a temperature not greater than about 20° C. in excess of the temperature of the aqueous condensate;

heating the aqueous condensate from the high temperature overhead condenser in a condensate stripper to desorb sulfur dioxide and produce a condensate stripper gas comprising water vapor and sulfur dioxide desorbed from the aqueous condensate; and cooling the condensate stripper gas and high temperature overhead condenser gas effluent in a low temperature condenser to condense water vapor and produce a recovered sulfur dioxide stream comprising sulfur dioxide obtained in the aqueous condensate and in the high temperature overhead condenser gas effluent and a stripped condensate effluent depleted in sulfur dioxide.

3. The process of claim 1 wherein the molar ratio of sulfur dioxide absorbed per equivalent mole of sodium malate in the aqueous absorption solution ranges from about 0.1 to about 1.

4. The process of claim 1 wherein the sulfur dioxide-enriched absorption solution is heated by transferring heat from the sulfur dioxide-containing effluent gas and/or regenerated sulfur dioxide absorption solution and the difference in temperature between the sulfur dioxide absorption solution introduced to the stripper and the regenerated absorption solution is less than about 40° C.

5. The process of claim 1 wherein sodium malate in the aqueous absorption solution is neutralized to within about 20% of the equivalence point of the less acidic carboxylic group having a pKa value of about 5.11 at 25° C.

6. The process of claim 1 further comprising, prior to reintroducing the regenerated sulfur dioxide absorption solution to the sulfur dioxide absorber, treating a slip stream of the regenerated sulfur dioxide absorption solution wherein the treating process comprises:
  diverting at least a portion of the regenerated sulfur dioxide absorption solution exiting the stripper as a slip stream;
  evaporating water from the slip stream of the regenerated sulfur dioxide absorption solution at a temperature of at least about 40° C. to produce a concentrated absorption solution supersaturated in the sulfate salt;
  precipitating sulfate salt crystals from the concentrated absorption solution to form a crystallization slurry comprising precipitated sulfate salt crystals and a mother liquor; and
  separating the sulfate salt crystals from the mother liquor to form a treated absorption solution comprising the polyprotic carboxylic acid salt;
  and wherein the treated absorption solution is combined with the remainder of the regenerated absorption solution, which is reintroduced to the sulfur dioxide absorber.

7. The process as set forth in claim 6 wherein water is evaporated from the slip stream of the regenerated sulfur dioxide absorption solution at a temperature of at least about 40° C.

8. The process as set forth in claim 6 wherein water is evaporated from the slip stream of the regenerated sulfur dioxide absorption solution at a temperature of at least about 60° C.

9. The process as set forth in claim 6 wherein the sulfate salt crystals precipitated from the concentrated absorption solution comprise sodium sulfate crystals and water is evaporated from the slip stream under conditions to substantially inhibit formation and precipitation of sodium sulfate decahydrate.

10. The process as set forth in claim 6 wherein the sulfate salt crystals are separated from the mother liquor by a centrifugal or vacuum filter or a centrifuge.

11. A process for selectively removing and recovering sulfur dioxide from a sulfur dioxide-containing effluent gas, the process comprising:
  contacting the sulfur dioxide-containing effluent gas with a buffered aqueous absorption solution comprising sodium malate in a sulfur dioxide absorber, thereby absorbing sulfur dioxide from the sulfur dioxide-containing effluent gas into the buffered aqueous absorption solution and producing an exhaust gas from which sulfur dioxide has been removed and a sulfur dioxide-enriched absorption solution;
  heating the sulfur dioxide-enriched absorption solution in a sulfur dioxide stripper to desorb sulfur dioxide and thereby produce a regenerated sulfur dioxide absorption solution and a sulfur dioxide-enriched stripper gas comprising water vapor;
  reintroducing the regenerated sulfur dioxide absorption solution to the sulfur dioxide absorber;
  wherein, immediately following the step of heating the sulfur dioxide-enriched absorption solution in the sulfur dioxide stripper producing a regenerated sulfur dioxide absorption solution and a sulfur dioxide-enriched stripper gas comprising water vapor and before reintroducing the regenerated sulfur dioxide absorption solution to the sulfur dioxide absorber, the process further comprises:
  increasing the pressure of the sulfur dioxide-enriched stripper gas;
  cooling the pressurized sulfur dioxide-enriched stripper gas by transfer of heat to the regenerated sulfur dioxide absorption solution in a reboiler of the sulfur dioxide stripper to condense water vapor and produce a reboiler gas effluent comprising sulfur dioxide and water vapor and an aqueous condensate comprising sulfur dioxide;
  heating the aqueous condensate from the reboiler in a condensate stripper to desorb sulfur dioxide and produce a condensate stripper gas comprising water vapor and sulfur dioxide desorbed from the aqueous condensate; and
  cooling the condensate stripper gas and reboiler gas effluent in a low temperature condenser to condense water vapor and produce a recovered sulfur dioxide stream comprising sulfur dioxide obtained in the aqueous condensate and in the reboiler gas effluent and a stripped condensate effluent depleted in sulfur dioxide.

12. The process of claim 11 wherein the sulfur dioxide-enriched absorption solution is heated by transferring heat from the effluent gas and/or regenerated sulfur dioxide absorption solution without the addition of extraneous heat.

13. The process of claim 12 wherein the temperature of the effluent gas is not reduced to below about 50° C.

* * * * *